Figure 1:
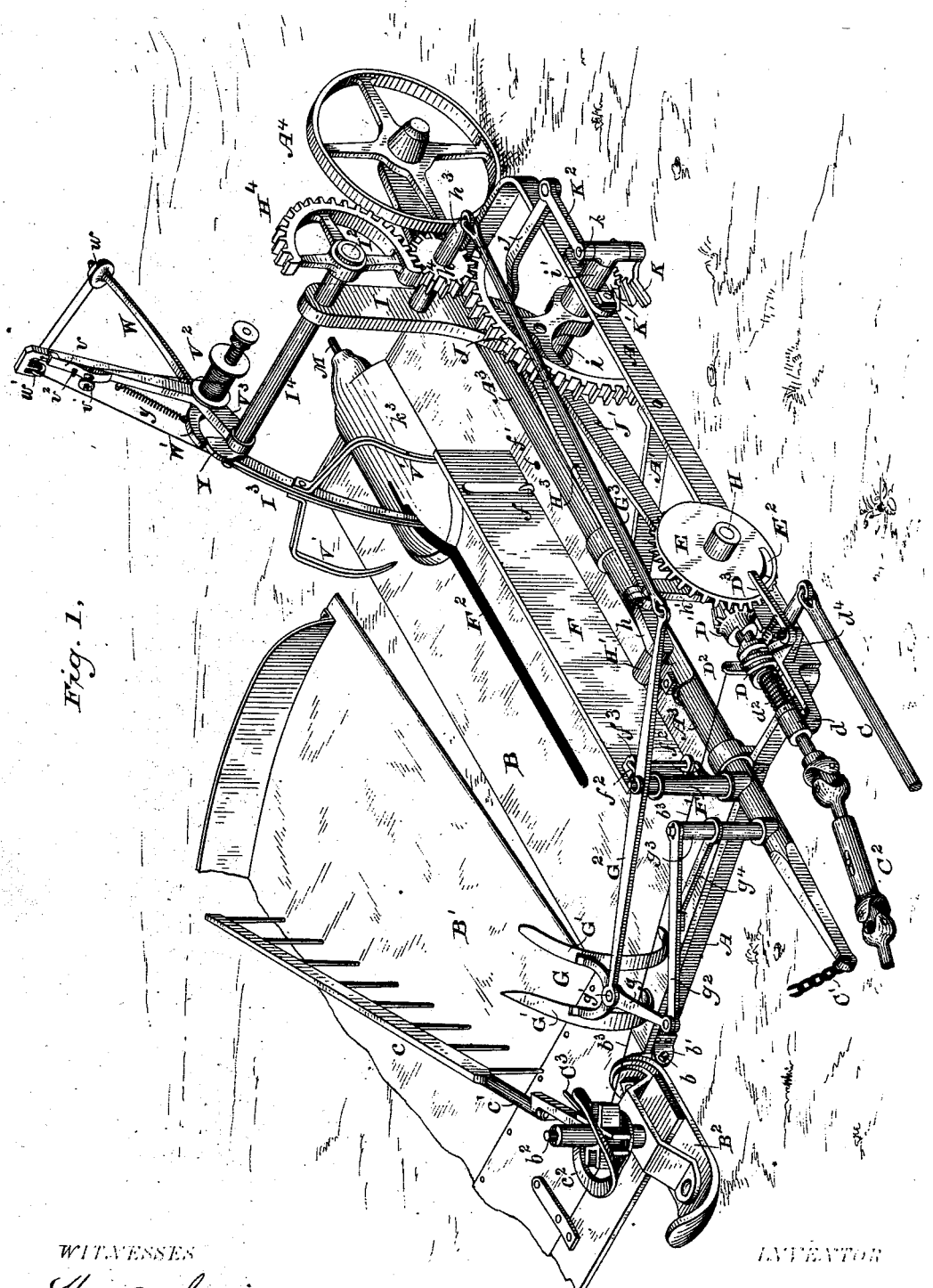

(Model.)

13 Sheets—Sheet 1.

J. R. SEVERANCE.
Grain Binder.

No. 237,135. Patented Feb. 1, 1881.

WITNESSES
Wm A. Skinkle
Geo. W. Beck

INVENTOR
James R. Severance,
By his Attorneys
Baldwin, Hopkins & Peyton

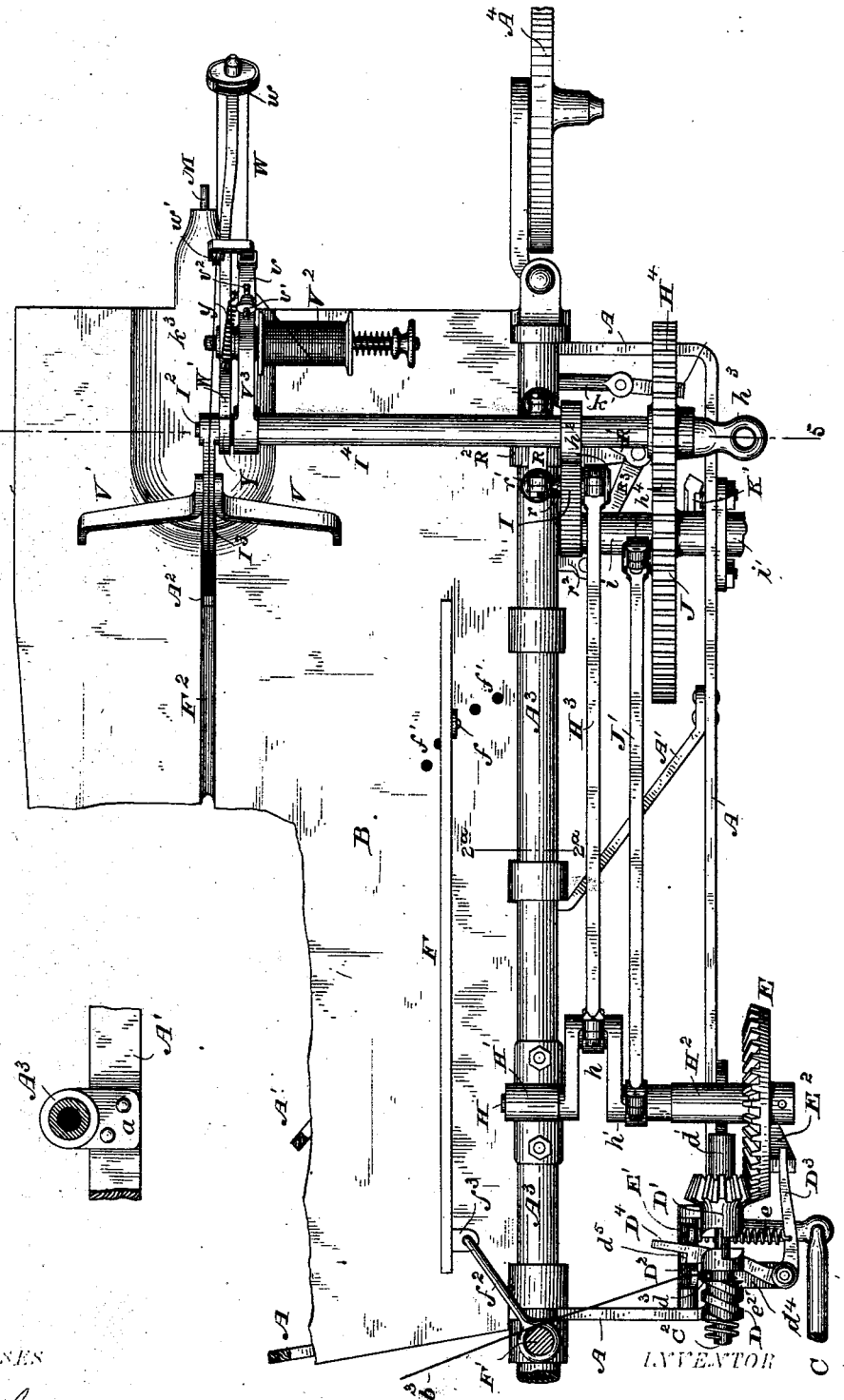

(Model.)
13 Sheets—Sheet 3.
J. R. SEVERANCE.
Grain Binder.
No. 237,135.    Patented Feb. 1, 1881.
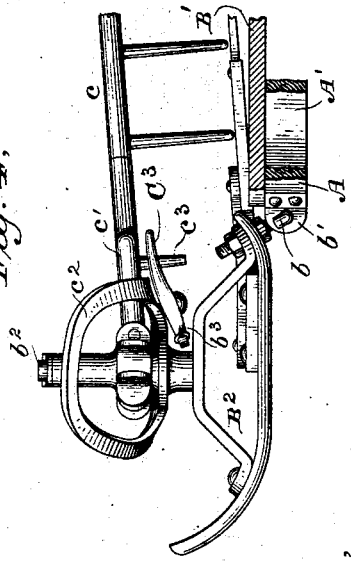
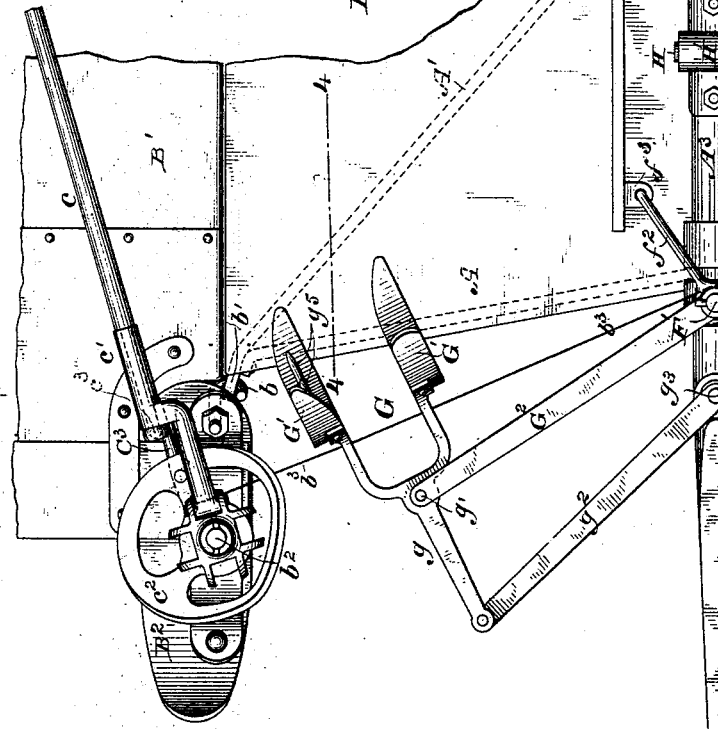
WITNESSES
Wm. A. Skinkle.
Geo. W. Breck.
INVENTOR
James R. Severance
By his Attorneys
Baldwin, Hopkins & Peyton (Model.)
13 Sheets—Sheet 4.
J. R. SEVERANCE.
Grain Binder.
No. 237,135. Patented Feb. 1, 1881.
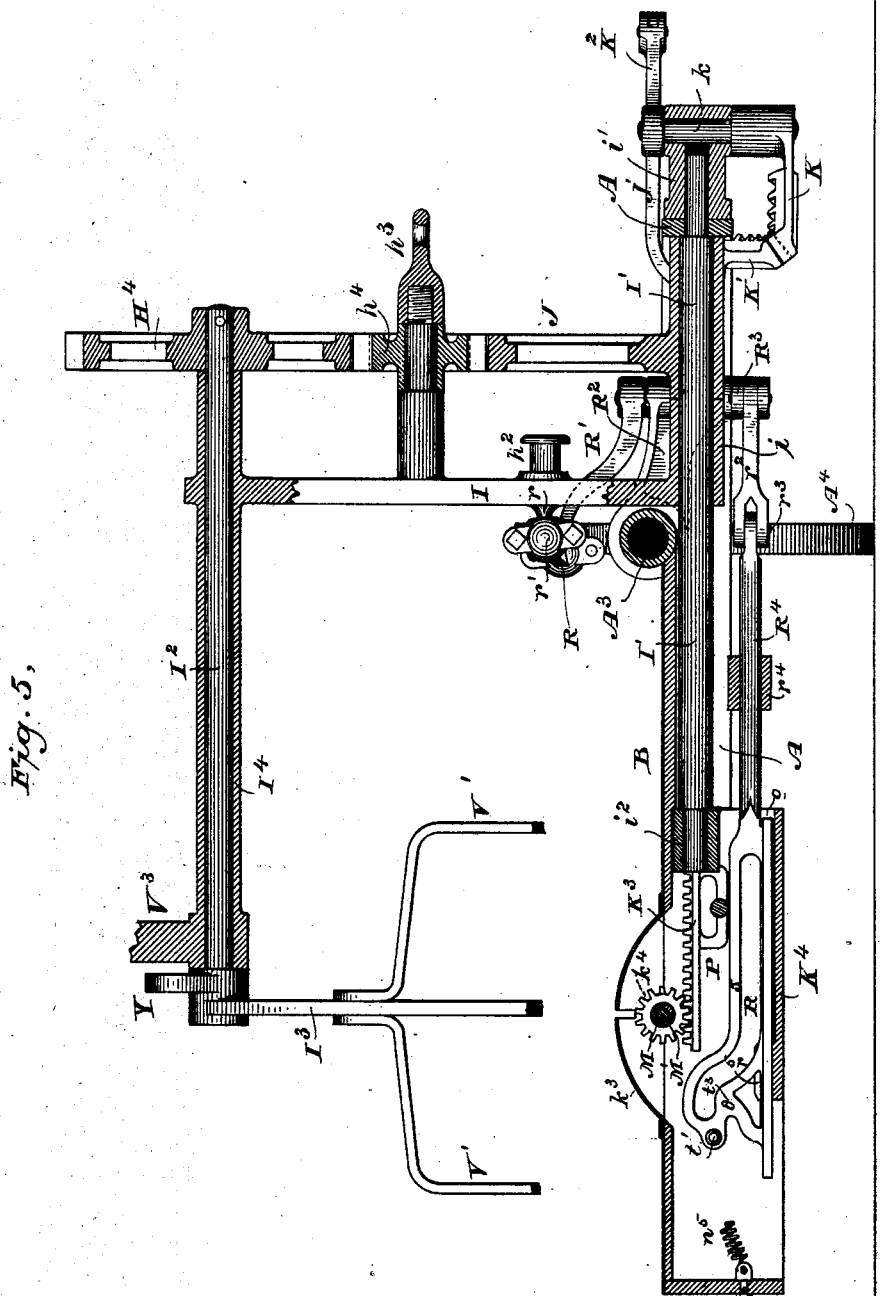
WITNESSES
Wm A. Skinkle
Geo W. Breck
INVENTOR
James R. Severance,
By his Attorneys
Baldwin, Hopkins & Peyton

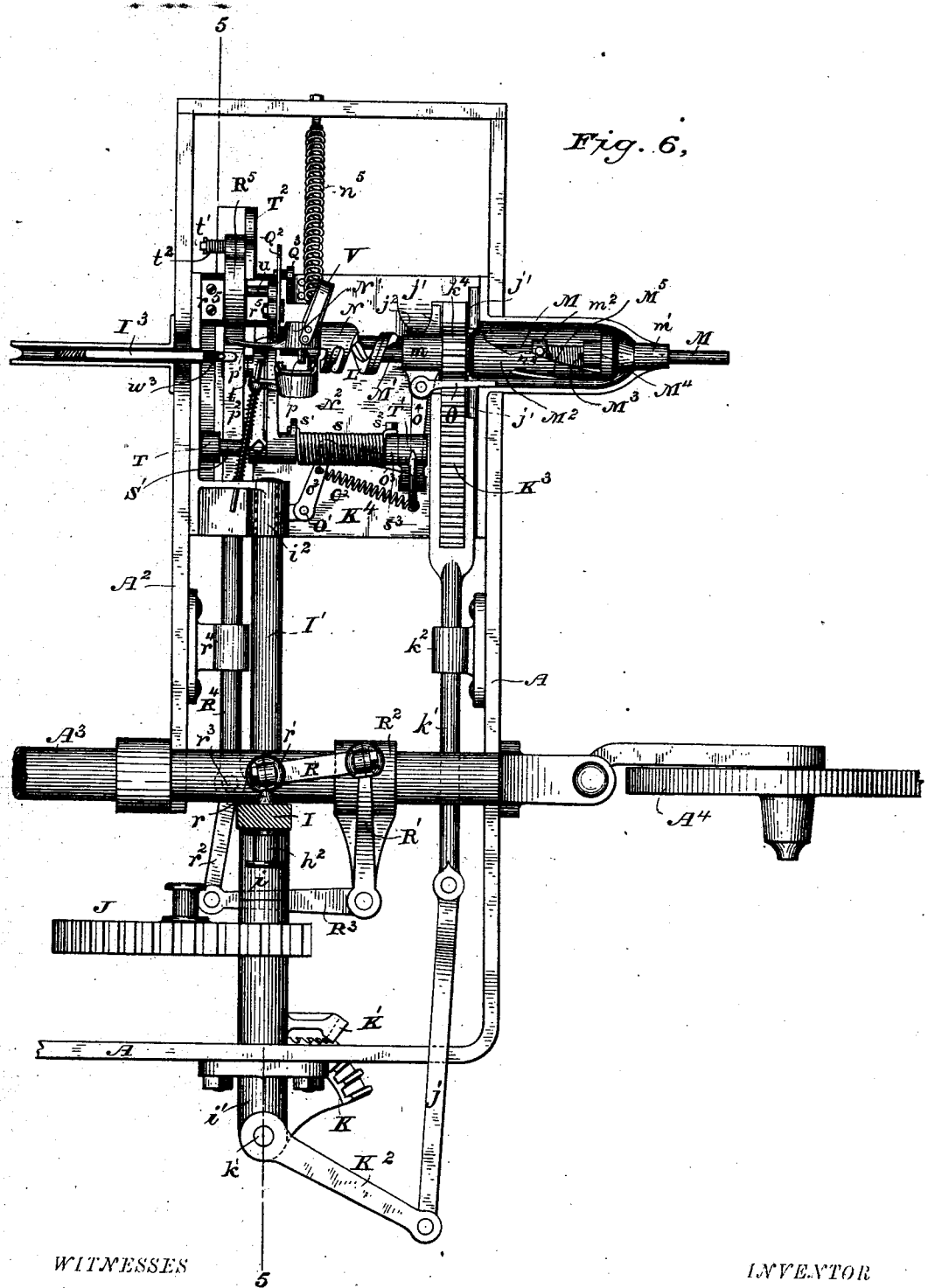

(Model.)
J. R. SEVERANCE.
Grain Binder.
No. 237,135.
13 Sheets—Sheet 6.
Patented Feb. 1, 1881.
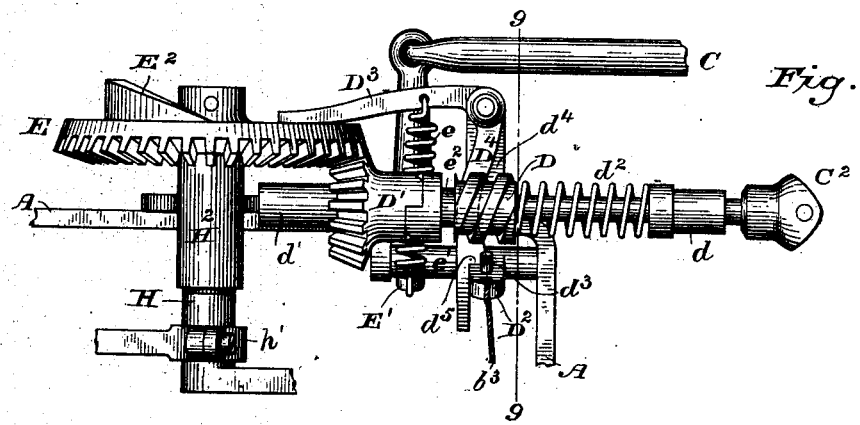
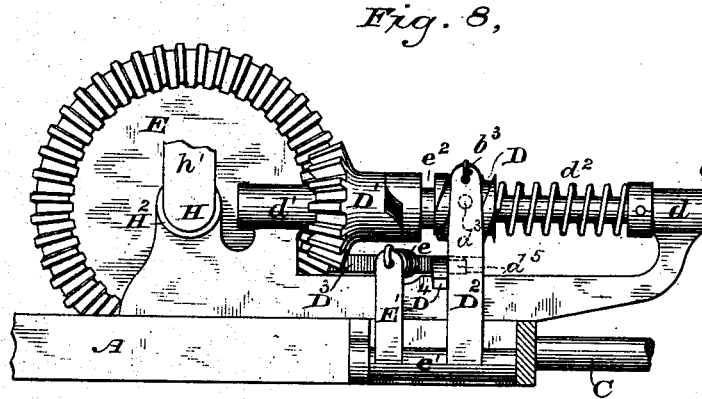
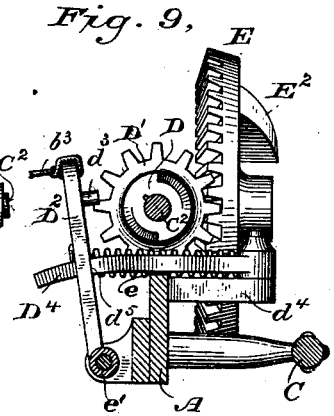
WITNESSES
Wm A Skinkle
Geo W Breck
INVENTOR
James R. Severance,
By his Attorneys
Baldwin, Hopkins & Peyton.

(Model.)

J. R. SEVERANCE.
Grain Binder.

No. 237,135. Patented Feb. 1, 1881.

WITNESSES
Wm. A. Skinkle
Geo. W. Breck

INVENTOR
James R. Severance.
By his Attorneys
Baldwin, Hopkins & Peyton.

(Model.)
J. R. SEVERANCE.
Grain Binder.
No. 237,135. Patented Feb. 1, 1881.
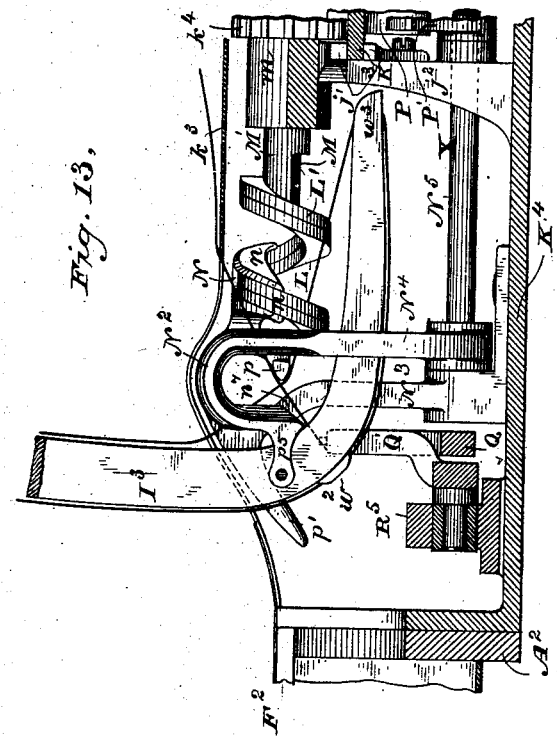
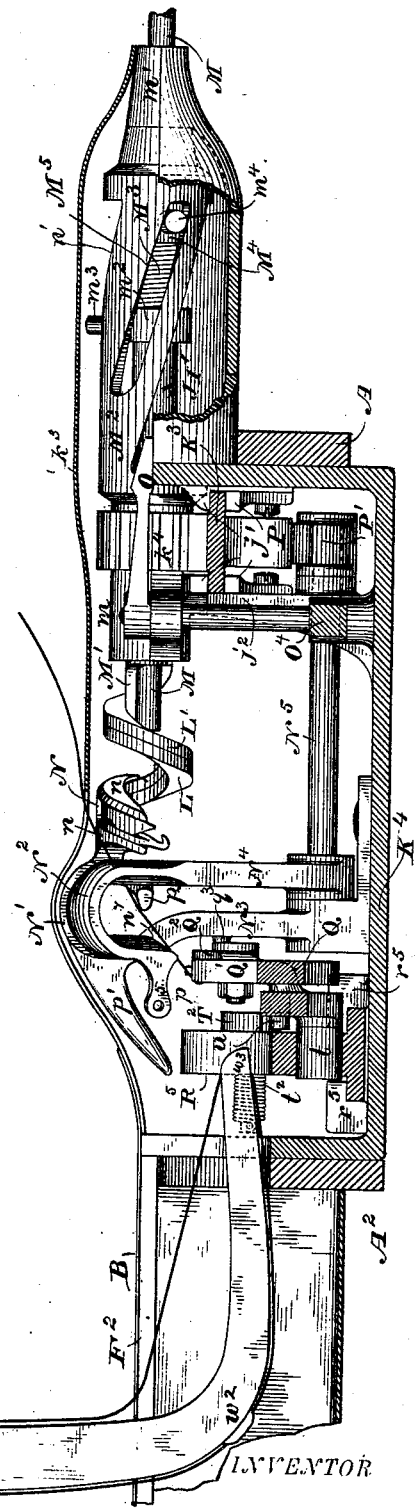
WITNESSES
Wm. A. Skinkle,
Geo. W. Breck.
By his Attorneys
Baldwin, Hopkins & Peyton.
INVENTOR
James R. Severance.

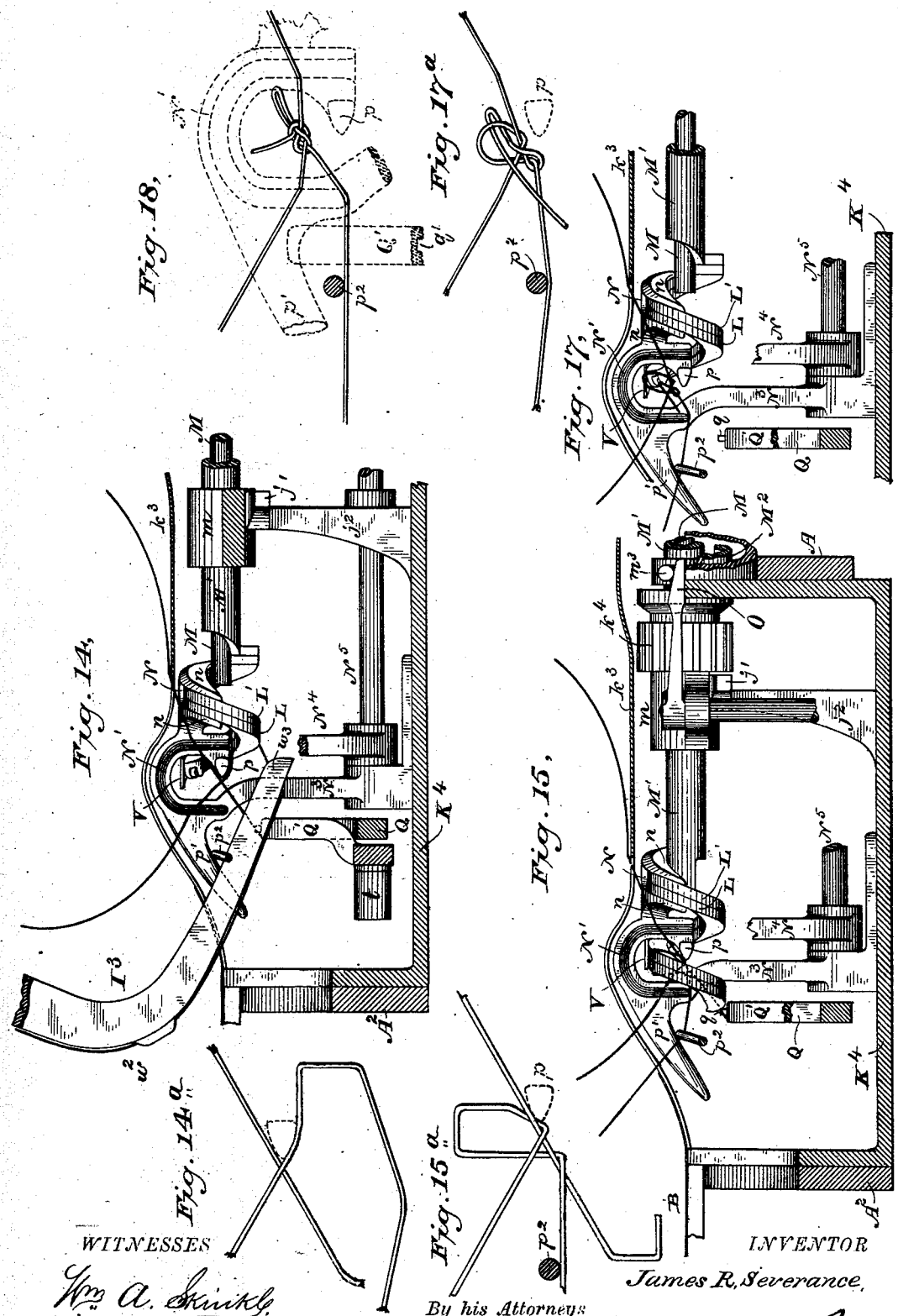

(Model.)
J. R. SEVERANCE.
Grain Binder.
No. 237,135.
13 Sheets—Sheet 10.
Patented Feb. 1, 1881.
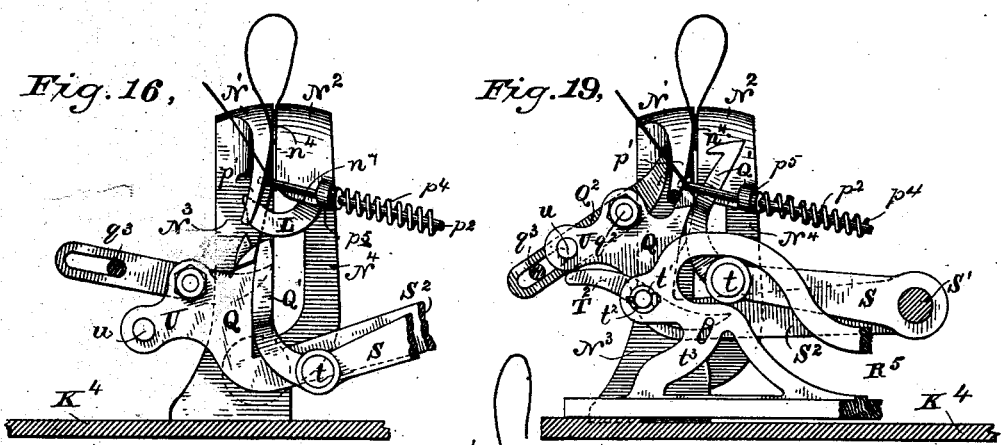
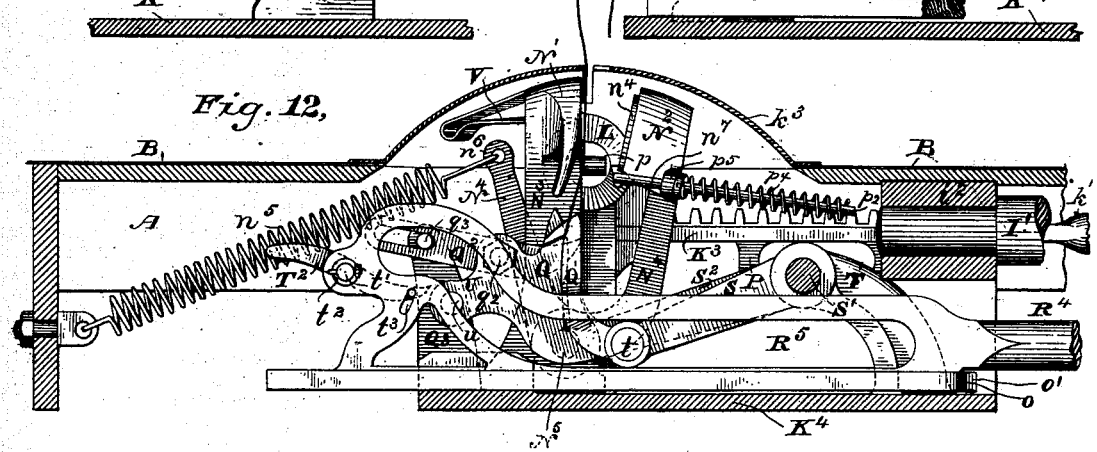
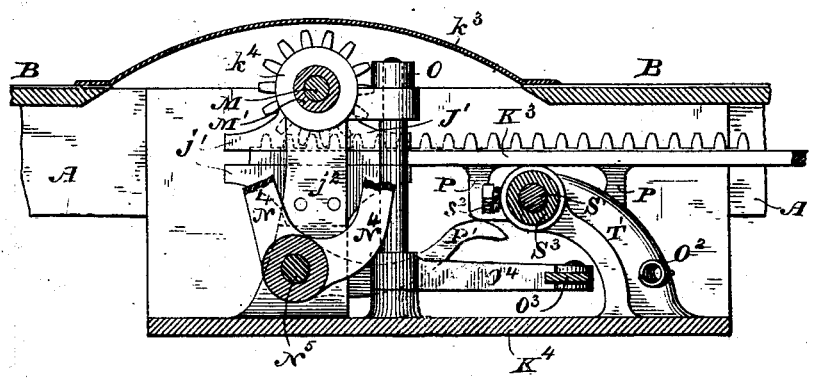
WITNESSES
Wm. A. Skinkle.
Geo. W. Breck.
INVENTOR
James R. Severance,
By his Attorneys
Baldwin, Hopkins & Peyton.

(Model.)
J. R. SEVERANCE.
Grain Binder.
No. 237,135.  Patented Feb. 1, 1881.
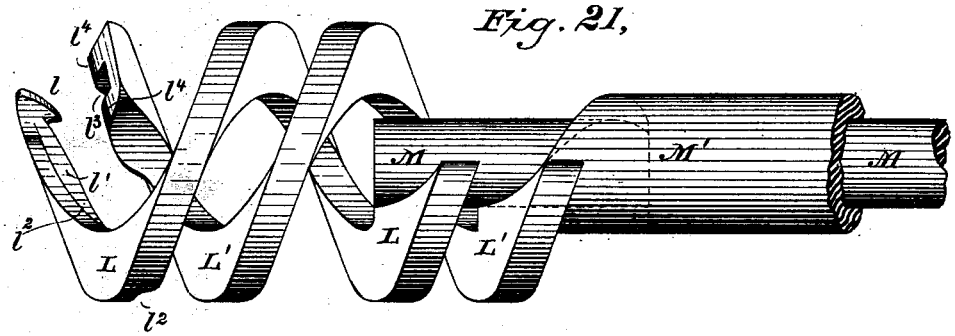
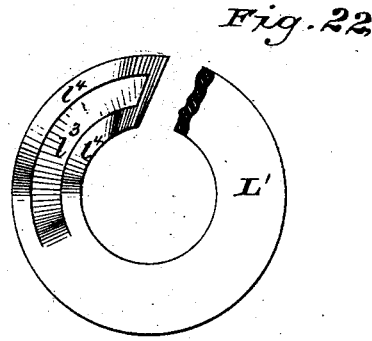
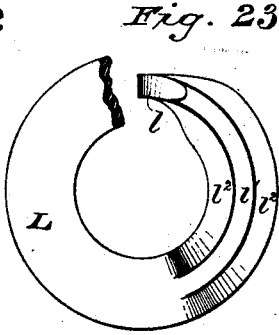
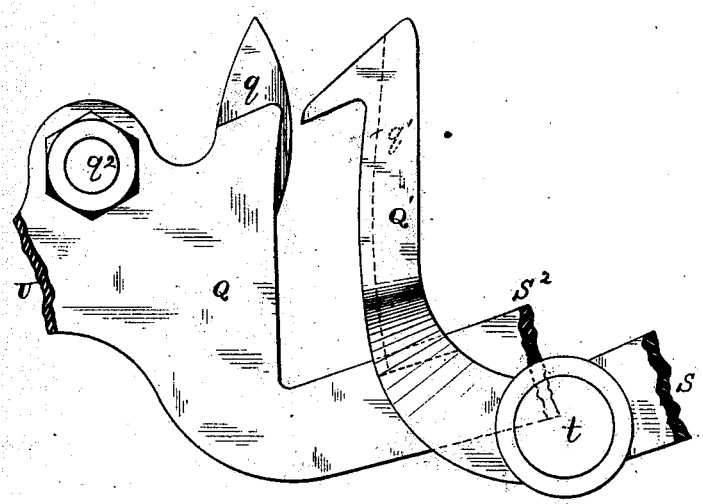
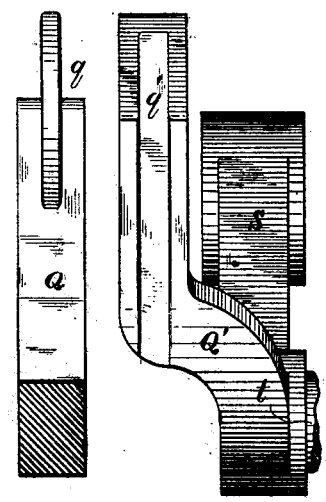
WITNESSES
Wm A. Skinkle
Geo. W. Beck
INVENTOR
James R. Severance.
By his Attorneys
Baldwin, Hopkins & Peyton

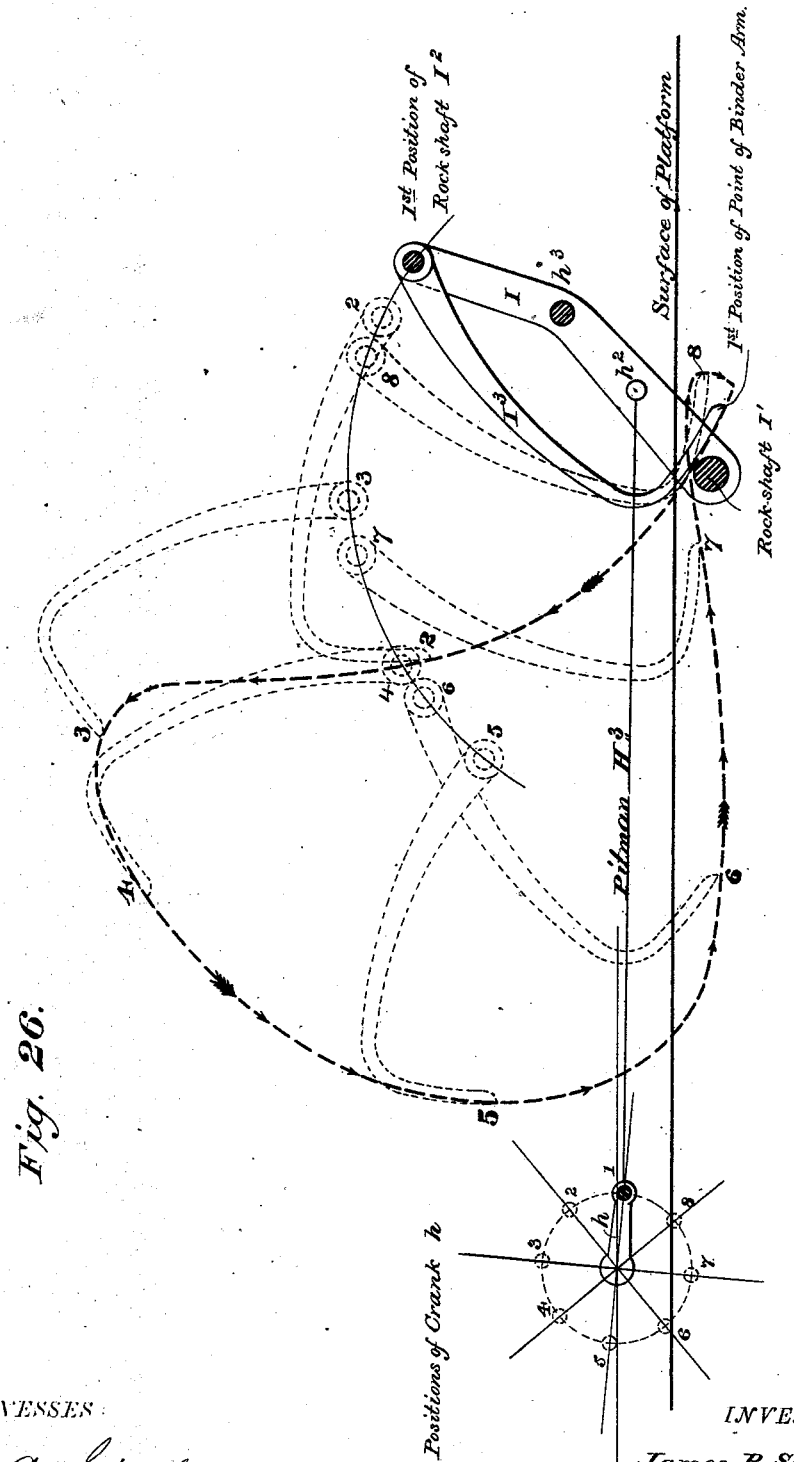

(Model.)

J. R. SEVERANCE.
Grain Binder.

No. 237,135.  Patented Feb. 1, 1881.

13 Sheets—Sheet 13.

WITNESSES
Wm A. Skinkle
Geo W. Breck

INVENTOR
James R. Severance,
By his Attorneys
Baldwin, Hopkins & Peyton.

UNITED STATES PATENT OFFICE.

JAMES R. SEVERANCE, OF BELLEVUE, OHIO.

GRAIN-BINDER.

SPECIFICATION forming part of Letters Patent No. 237,135, dated February 1, 1881.

Application filed July 23, 1880. (Model.)

*To all whom it may concern:*

Be it known that I, JAMES R. SEVERANCE, of Bellevue, in the county of Sandusky and State of Ohio, have invented certain new and useful Improvements in Grain-Binders, of which the following is a specification.

My invention relates to improvements in automatic binders of the class in which cord is employed to secure the bundles of grain, of the class in which are employed supplemental binding attachments or binder-frames constructed separately from the harvesters in connection with which they are used, and of that particular type of such binding attachments in which the binding mechanisms are thrown into action by the reaper-rakes.

My objects mainly are as follows: To securely knot together the ends of the band or cord about a bundle without any slack, practically considered, in the band; to form the knot without any assistance arising from strain on the band due to the expansive tendency of the bundle, thus rendering unnecessary an excessive compression or condensation of the bundle in encircling it by the cord and preliminary to knotting the band ends, so as to provide for such expansion, and admitting of the use of a lighter or weaker cord than would be required to stand the additional strain exerted on it, as in that class of binders in which the cord is so tightly drawn around the bundle as to take avail of its expansion to assist in forming the knot; to avoid waste of cord by forming the knot in part out of that portion of the cord which is between the bundle and the points of contact of the band ends when first brought together; to govern the operations of the binding mechanism or cause it to act or be inoperative without any other attention on the part of the driver of the harvester to which the binding attachment is coupled than that required to regulate the size of the gavels by governing the operations of the commonly employed tripping or oscillating rakes of the machine; to so construct the binder-frame or supplemental binding attachment and adapt it for connection with a reaper and its platform that the binder-frame, when attached and in operation, will be free to move over the ground without injurious interference from or with the reaper and its platform, shall always occupy the proper position relatively to the reaper-platform to receive the grain therefrom as swept off by the rake or rakes, and yet allow of all the usual and necessary movements of the reaper in action, such as the raising and lowering of the cutting apparatus, the rocking of the guards, and the tilting of the platform.

My objects also are generally to improve the binding mechanism and perfect the details thereof.

The subject-matter deemed novel will hereinafter be indicated by the claims.

The accompanying drawings illustrate so much of a harvester with the binder attachment therefor as is deemed necessary to show all my improvements as embodied in the best way now known to me. Some of the novel features thereof may, however, be used without others—as, for instance, by dispensing entirely with some parts, such as may be omitted without impairing the functions or materially lessening the efficiency in operation of those retained, or by the employment for omitted parts of equivalents or modifications thereof, co-operating with those novel and leading features of the improvements which may be retained, or by engrafting my invention in part upon binders of types differing in general respects, or more or less in various particulars, from a machine of the class in connection with which my improvements are all preferably employed, and, as in this instance, sufficiently illustrated for the purposes of describing and defining my invention.

Figure 10:
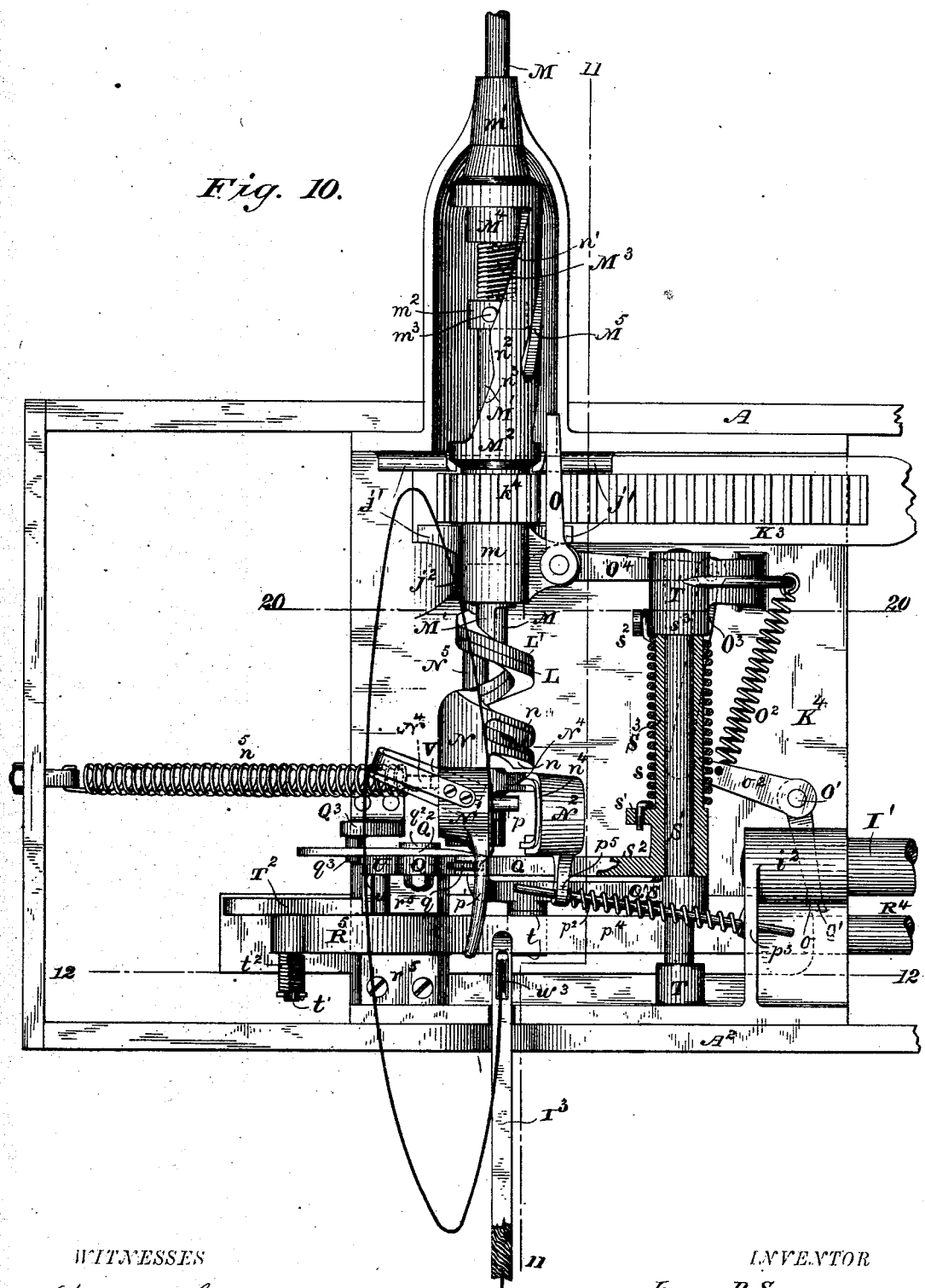
Figure 27:
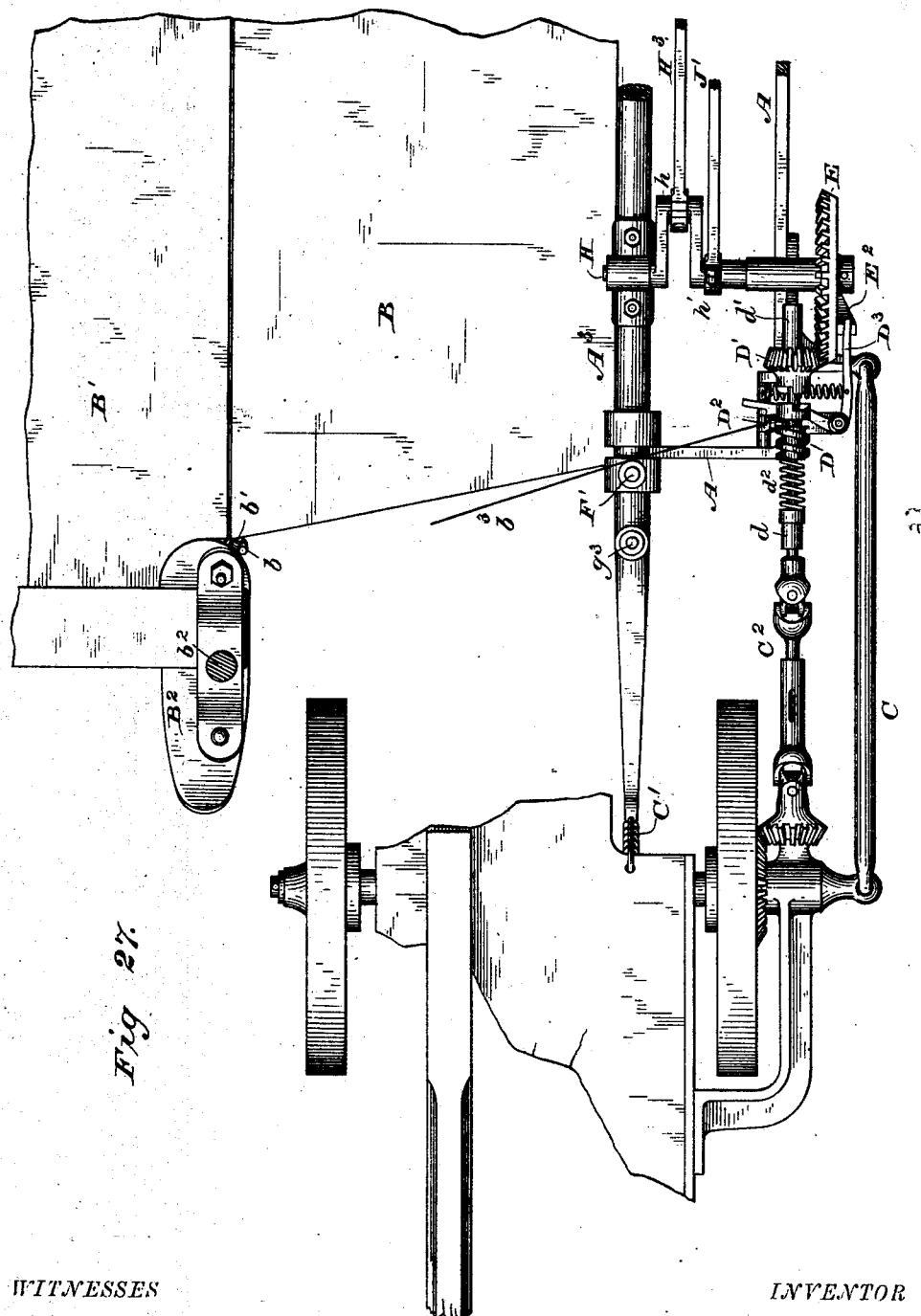

Figure 1 is a view, in perspective, of the binding-platform or binder-frame and grain-receptacle and the binding mechanism, with parts of the grain-platform, rake, &c., of an ordinary self-rake reaper to which the binder-frame is connected. Fig. 2 is a plan or top view of portions of the binding-platform, the frame upon which it is supported, and the binding mechanism; Fig. 2$^a$, a vertical transverse section on the lines 2$^a$ 2$^a$ of Figs. 2 and 3, showing in detail one of the brackets or connections between the binder-frame and the beam or bar which supports and balances said frame and the binding-platform, and mechanism thereon in rear of the reaper proper, the said beam being flexibly connected at its front with the frame or main axle of the reaper and supported at rear by a caster-wheel. Fig. 3 is a plan or top view, showing some of the parts represented by Fig. 2 and others omitted therefrom; Fig. 4, a view partly in vertical longitudinal section on the line 4 4 of Fig. 3 and partly in side elevation, as seen from the inner front corner of the grain-platform, representing the jointed connection between the grain-platform and the binder-frame, and in part the means employed for throwing the binding mechanism into operation by the action of the rake or rakes as the grain is swept from the grain-platform to the binding-platform. Fig. 5 is a view partly in elevation, as seen from the front, and partly in vertical transverse section in or about the planes indicated by the lines 5 5 of Figs. 2 and 6, showing part of the binding-arm, features of the knotting mechanism, and immediately connected or co-operating parts. Fig. 6 is a plan or top view, with parts in section, of the rear portions of the binder-frame and parts of the binding mechanism, the grain-receptacle or platform proper and the cover of the knotting devices being removed to show the parts beneath. Fig. 7 is a view representing, in plan, details of the clutch mechanism or devices for throwing the binding mechanism into and out of operation, with portions of the binder-frame and devices for coupling it to the reaper; Fig. 8, a side elevation of parts represented in Fig. 7; Fig. 9, a front elevation thereof, with parts in section on the line 9 9 of Fig. 7. Fig. 10 is a plan or top view, with the grain-receptacle and shield for the knotter removed, showing on an enlarged scale some of the parts represented by Fig. 6; Fig. 11, a view partly in side elevation and partly in vertical longitudinal section on the line 11 11 of Fig. 10; Fig. 12, a view partly in front elevation and partly in vertical transverse section on the line 12 12 of Fig. 10. Fig. 13 is a view partly in side elevation and partly in longitudinal section, generally similar to but not showing all the parts represented in Fig. 11, and illustrating the positions assumed by the binder-arm at or about the completion of its swing or inward movement, the knotter having at this time commenced to advance, and having engaged or crossed the cord and the cord-holding jaws or clamps having closed upon the cord. Fig. 14 is a sectional elevation, generally similar to Fig. 13, with the movable arm or jaw of the cord-clamp broken away, the parts being represented in the positions assumed shortly after the binder-arm has commenced to withdraw or swing outward and upward, the cord at this stage of the operation being partly looped, as plainly shown by the diagram Fig. 14$^a$, by the conjoint action of the binder-arm, the knotter, and co-operating devices. Fig. 15 is a sectional elevation, generally similar to Fig. 14, some of the devices which are not shown in Fig. 14 for controlling the action of the parts being here supplied, and the positions in which the parts are represented being that assumed by them when the operation of knotting has progressed to the point at which the cord is looped and crossed, as clearly shown by the diagram Fig. 15$^a$, and at which stage in the operation the knotter is about to grasp the cord and the binder-arm has swung up out of the slot in the grain-receptacle; Fig. 16, a front elevation of the cord-clamps, the nippers or tongs for holding the end of the cord, and the cutter, showing the parts in the positions they occupy at the stage in the knotting operation represented by Figs. 15 and 15$^a$. Fig. 17 is a sectional elevation, generally similar to the views represented in Figs. 14 and 15, showing the positions assumed by the parts just as the knotter is on the point of completely withdrawing from the loop in the cord and when the knot has been partially or loosely formed, as clearly represented by the diagram Fig. 17$^a$. Fig. 18 is a diagram representing the complete knot in the position it is left after having been drawn tight, just before the cutter acts to sever the cord. Fig. 19 is a front elevation, generally similar to Fig. 16, the parts being represented in the positions assumed just prior to that stage in the knotting operation shown by Fig. 18 and about at or immediately after the time during which the parts occupy the positions in which they are shown by Fig. 17. Fig. 20 is a view partly in front elevation and partly in vertical section on the line 20 20 of Fig. 10, showing the knotter-actuating rack and pinion and adjacent parts. Fig. 21 is a "forced" view, showing the spirals of the knotter as separated instead of resting in contact, to clearly convey an understanding of the peculiar formation of the double-spiral knotter; Fig. 22, a front or end view of that spiral or member of the knotter which is grooved at its end; Fig. 23, a similar view of the other or hook-and-tongue-ended member of the spiral. Fig. 24 is a forced view, showing a side elevation of the cord nippers or tongs arranged in positions relatively to each other which they never occupy in operation, this view being designed to clearly show the peculiar formation of the tongs; Fig. 25, a view showing the edges or surfaces of the two arms or members of the tongs which face each other and work in contact in operation. Fig. 26 is a diagram representing the movements of the binder-arm. Fig. 27 represents such parts of the binder-frame or binding attachment and a reaper as are necessary to illustrate the manner of coupling them together.

A binder-frame constituting an auxiliary rear carriage or supplemental attachment hinged behind an ordinary grain-harvester of any approved construction is made of skeleton form and strongly braced. In this instance the binder-frame is composed of a bar, A, bent to form three sides of the frame, (the front, rear, and outer sides,) a diagonal bar, A', a cross-bar, A$^2$, and a longitudinal bar or main supporting-beam, A$^3$, preferably of tubular form, so as to secure maximum strength and minimum weight and effectually resist the twisting or torsional strains to which the frame is constantly subjected. This frame supports a binding-platform or grain-receptacle, B, terminating at its outer edge at the beam $A^3$, and all the mechanism of the binder proper. Clips or brackets $a$, firmly connected with the frame-bars A, $A'$, and $A^2$, and the longitudinal beam $A^3$, rigidly unite the frame-pieces, and in this way wind or twist is prevented. A caster-wheel, $A^4$, supporting the binder-frame behind, is mounted at the rear end of the beam $A^3$. A strong joint permitting action in all directions connects the binder-frame either with the shoe or finger-beam at the front inner corner of the grain-platform $B'$ of the reaper or directly with said platform. In this instance a suitable universal joint or two-motion hinged connection between the binder-frame and the heel of the shoe $B^2$ is shown as formed by a hooked bolt, $b$, and an eye or socket at the front inner end, $b'$, of the diagonal frame-bar $A'$, close to the point where the frame-bar A is rigidly united to this diagonal bar.

A drag-bar, C, having a jointed connection at its rear end with the binder-frame at or near its outer front corner, and a supporting link or chain, $C'$, connected with the front end of the main bar or supporting-beam $A^3$, serve, in addition to the jointed attachment to the inner front corner of the grain-platform, to make all necessary draft and supporting-connections between the binder-frame and the reaping-machine. The drag-bar C may be attached in any of the suitable obvious ways to the reaper—as, for instance, to the outer end of the main axle, or to a cross-bar or bracket on the frame or tongue of the machine; and the chain $C'$ may be connected either directly with the main axle or to the heel of the tongue, or to any suitable part of the reaper-frame.

An extensible and universally-jointed or tumbling shaft, $C^2$, actuated by the reaper-gearing, imparts motion to the binding mechanism.

Obviously the precise points of attachment to the reaper of the beam $A^3$ and drag-bar C, the point of connection of the drag-bar to the binder-frame, and the manner of connecting the tumbling-shaft with and operating it from the reaper-gearing will depend largely upon the type of machine with which the binder is used.

One way of attaching the binder-frame to a reaper is clearly shown in Fig. 27, from inspection of which it will be apparent that mechanical skill only is needed to connect the binder with most any one, if not all, of the fully-organized side-delivery reaping-machines of the present day, whether one or two wheeled or front or rear cut. All that it is necessary to do to make a proper draft and supporting connection between the binder-frame and the reaper is so to couple them together by means of the hinged connection $b\ b'$, or its equivalent, the beam $A^3$ and the drag-bar C, that the binder-frame will be suitably suspended and supported at its front above the ground, and, together with the mechanism which it supports, be balanced, or nearly so, upon the beam $A^3$, so as to relieve the reaper-platform of all unnecessary and injurious strains.

As will be apparent on examination of the drawings, particularly Figs. 1, 3, and 4 thereof, the binding-platform and the grain-platform or reaper-platform proper approach each other closely at their adjacent edges, and are free to partake, without interfering with each other, of all necessary vertical movements arising from inequalities of the surfaces over which the caster-wheel $A^4$ of the binder-frame and the main supporting and grain wheels of the reaper pass. The usual adjustments, such as the rocking of the guards, thus varying the inclination of the platform of the reaper and the raising and lowering of the cutting apparatus, may freely be given without injuriously affecting the binding-platform or interfering with the proper position thereof relatively to the grain-platform $B'$. In actual working position the inner or adjacent edges of the two platforms move throughout their adjustments in practically parallel vertical planes, and in ordinary operation, as upon level or smooth ground, the two platforms diverge slightly from front to rear, the reaper-platform inclining upward, as is well understood, from the finger-beam backward. This difference between the heights of the rear of the grain-platform and of the binding-platform is ample to enable the latter to rise considerably from its normal position, or to an extent sufficient to accommodate all movements under ordinary circumstances, as the caster-wheel ascends without elevating the binding-platform to the level of the grain-platform.

It will be seen that when the inner supporting-wheel of the reaper or the heel end of the finger-beam ascends or descends the proper relative positions of the adjacent edges of the two platforms will be maintained by the tilting of the binding-platform on the supports at the front and rear ends of its balancing longitudinal beam $A^3$. In operation the binding-platform never ascends above the level of the grain-platform at its rear inner edge, so as to prevent the proper delivery of the grain by the rake, as will hereinafter be explained.

The advantages arising from the above-described manner of hinging the two platforms together at the one point only, so as to allow of all necessary adjustments of the reaper-platform and leave them free to be self-adjusting independently of each other, will be obvious when the machine is compared with machines of the same general type as heretofore constructed. Such machines as constructed or patented prior to my invention had, so far as my knowldge extends, either a rigid connection between the binder-frame and supplemental platform and the reaper-platform, or else a flap-like hinged connection or flexible attachment of the two platforms, which prevented free independent movement of the two platforms and resulted in injurious strains and imperfect operation. A hinged connection of the two platforms at their adjacent edges from front to rear, or in such manner as to compel the edge of the one to follow the movements of the edge of the other throughout, or at the rear as well as at the front, would not answer the purposes here in view, which are perfectly accomplished by hinging the binder-frame or auxiliary carriage at its inner front corner only to the inner front corner of the grain-platform, or to the cutting apparatus adjacent thereto, and by otherwise coupling the binder-frame to and supporting it behind the reaper in the manner shown.

To enable the attendant or driver of the machine to throw the binding mechanism into operation at will without any other attention on his part than is required to regulate the size of the gavels by controlling the action of the rake, I employ or attach the binder-frame to a machine having combined reels and rakes of any of the well-known convertible or controllable types, variously designated as "trip-rakes," "oscillating rakes," "cam-switch rakes," &c., which rakes, as is well understood, are intermittent in action, being caused to act at times simply as reels or beaters and at other times as rakes proper, to sweep off the grain when accumulated upon the platform to form a gavel.

In the drawings only a single rake-arm, $c$, with an oscillating head, $c'$, is shown with the rake-post $b^2$ and track $c^2$; but any of the convertible rakes and reels may be employed, and the tripping mechanism connected with the ordinary hand or foot lever within reach of the driver in his seat on the machine is such as commonly employed, and therefore it has not been deemed necessary to here illustrate and describe it.

A pin or short arm, $c^3$, on the heel or inner end of the rake-head strikes against a tripping-lever, $C^3$, when the rake-head acts as a rake, and by vibrating this lever on its pivotal support—in this instance secured to and beneath the rake-cam or track $c^2$—pulls on the cord or chain $b^3$, connecting said lever with clutch mechanism or shipping-gear actuated by the tumbling-shaft $C^2$, and sets the binding mechanism in operation, preferably by the means and in the manner presently to be described. Whether the horizontally-vibrating lever mounted on the rake-cam or an otherwise-supported lever vibrating horizontally or vertically or at an inclination to the rake-post be employed will depend upon circumstances, it being necessary only to have the lever operated by the rake in such manner as to pull on the cord $b^3$. The precise location and plane of movement of the lever will depend mainly upon the style of rake, and the modifications required would be suggested to the ordinary mechanic having knowledge of these improvements.

The tumbling-shaft rotates continuously during the working of the machine, and is mounted at and near its outer end in suitable bracket-bearings, $d\ d'$, at the outer front corner of the binder-frame. The constantly-rotating sliding member or section of the clutch-coupling, which moves upon the tumbling-shaft endwise thereof, is provided with a worm-gear, D, terminating in a deepened annular groove, $e^2$, and has the usual feather or spline connection with the shaft. This clutch-section, at its outer end or shouldered and recessed head, is of the usual form for engagement with the correspondingly-formed inner end surface or head of the loosely-mounted member or section D' of the clutch-coupling, which has no endwise movement on the shaft $C^2$. This loose member D' of the clutch has a bevel-pinion formed with or rigidly attached to it, which meshes with and intermittingly actuates a large bevel-gear wheel, E. A spring, $d^2$, encircling the shaft $C^2$, bears at its opposite ends, respectively, against the movable section or worm-gear member D of the clutch and a collar fixed on the shaft and working against or near the bearing $d$. This spring acts constantly with a tendency to move forward this clutch-section if out of gear, and to hold it engaged with the clutch-section D' if in gear therewith.

A clutch controller or shifter is shown as composed of a vertically-rocking arm or oscillating post, $D^2$, pivoted at its lower end in suitable lugs on the binder-frame, and provided with a stud, $d^3$, projecting toward the worm-gear of the clutch. This shifter-stud is of a size to work freely in the thread or worm of the clutch-section D. An elbow-lever is pivoted at its bend, or at the junction of its two arms $D^3\ D^4$, so as to vibrate horizontally on its pivot, supported by an arm, $d^4$, projecting outwardly from the binder-frame. In its operative position this elbow-lever serves, by its stop-stud or shoulder $d^5$, to dog the pivoted shifter arm or post $D^2$ and keep its stud $d^3$ out of contact with the clutch-section D. This stop $d^5$ is on the arm $D^4$ of the elbow-lever, near its end. One end of the cord $b^3$ which connects with the tripping-lever $C^3$ is attached to the top of the shifter $D^2$. A spring, $e$, connects an arm, E', on the pintle or pivot-sleeve $e'$ of the clutch shifter or controller $D^2$ with the arm $D^3$ of the elbow-lever near its pivot.

The intermittingly-rotating bevel-wheel E is provided on its outer face with a cam-projection or inclined tappet, $E^2$.

The sections D and D' of the clutch-coupling are, in this instance, each provided with two spurs or shoulders at their adjacent ends or heads, and with two recesses for interlocking therewith, and the worm-gear of the adjustable member of the clutch is double—that is, formed with two spiral grooves or threads.

By providing a worm or thread for each spur on the clutch-section D, whatever number of spurs there may be used, a prompt action and a nicety of adjustment are secured, the mechanism being thrown out of gear, as presently to be described, at corresponding times, or with the working parts in the same positions at each cessation of their operations.

By reference to Figs. 1, 2, 3, 7, 8, and 9 it will be seen that the operation of the clutch mechanism is as follows: When the clutch-sections are disengaged, as in Figs. 1, 2, and 3, the stud $d^3$ of the shifter-arm or controller engages the annular groove $e^2$ between the outer end of the worm and the rear end or shoulder of the head of the section D of the clutch. At this time the stop $d^5$ does not act on the shifter, and the arm $D^3$ of the elbow-lever is out of contact with the driven bevel-pinion E and behind its incline. When a rake is thrown into action to sweep a gavel from the reaper-platform B' to the binding-platform or grain-receptacle B and the tripping-lever $C^3$ is struck, the pull on the cord $b^3$ by the vibration of the lever draws the shifter-stud out of the groove in the continuously-rotating clutch-section D, which is immediately forced forward by the spring $d^2$ and engages the other section of the clutch. This starts the wheel E and the binding mechanism, hereinafter to be described, to which motion is communicated by or through this wheel. The outward swing of the shifter $D^2$ enables the spring $e$ to act on the elbow-lever so as to throw the dog or stop $d^5$ on its arm $D^4$ into operation to temporarily hold the shifter out of action, as in Figs. 7, 8, and 9. When the binding-mechanism-actuating wheel E has rotated far enough to bring its incline or tappet $E^2$ into action against the elbow-lever arm $D^3$, now close to the face of the pinion, the outward movement imparted to this arm disengages the dog $d^5$ on the other arm of the lever from the shifter $D^2$, which then engages the clutch-worm by its stud. The rotation of the worm thus engaged by the shifter causes the disengagement of the two sections of the clutch, and the stud $d^3$ finally works in the annular groove $e^2$. The operation of the wheel E and binding mechanism is thus automatically intermitted by positively-acting self-controlling devices, and the pause in the action of the mechanism continues until the next actuation of the clutch-shifter.

It will be seen from the above description that every time a gavel is delivered to the binding-platform the binding mechanism is thrown into gear; and that after certain operations, hereinafter to be explained, have been performed by the various parts of said mechanism, all of which have motion imparted to them through or by way of the shaft $C^2$, the operation of the binding mechanism is automatically stopped, thus rendering it only necessary for the driver to properly control the raking mechanism or regulate the size of gavels and times of their delivery to the grain-receptacle or binding-platform, to be compressed, gathered, and bound by mechanism such as is next to be described.

A grain-guard or regulator-board, F, against which the heads of the stalks of grain abut as they are swept upon and slide across the smooth surface of the grain-receptacle B, is supported and rendered adjustable to suit variations in the length of grain. The functions of arresting the grain and of adjustability to suit its length are imparted to this grain-guard by the peculiar manner of supporting and adjusting it, as follows: One end of the guard F is hinged so as to swing horizontally to a limited extent about a post, F', while its opposite end is provided with a lug or pin, $f$, for engagement, according to adjustment, with any one of a series of holes, $f'$, arranged in an arc or curved row of a radius corresponding to that of the arms or links $f^2 f^2$, by which the opposite end of the regulator-board is hinged to the post F'. By this way a parallelism of position throughout the adjustments is secured, and the regulator, when properly secured, is always held parallel with the slot $F^2$ in the grain-receptacle. In this instance the post F' is on the longitudinal beam $A^3$, near its front end, and the radius arms or links $f^2 f^2$ are formed by a single rod passed through a lugged bracket, $f^3$, near the front end of the regulator-board, and then bent into yoke shape and provided with hooks or rings at its ends to engage and turn about the post. This regulator serves, in connection with a gavel compressor and gatherer, G, to condense the bundles for the binder-arm, as will fully be understood farther on.

The compressor proper, or its head or gatherer G, is shown as formed of two curved arms or teeth, G' G'; but there may be three or more such teeth, or even a slotted head of wood or sheet metal, if preferred. A shank, $g$, connects the head or teeth of the compressor with the outer end of a lever, $G^2$, by a pivot, $g'$. This lever is fulcrumed upon the post F', and is vibrated horizontally on its pivot on the post by suitable means. In this instance a connecting rod or link, $G^3$, jointed to the outer end of the lever and operated in the manner to be hereinafter explained, imparts the necessary vibratory movement thereto. A link-rod or controlling-arm, $g^2$, is jointed at its opposite ends to the heel end of the shank $g$ of the compressor and to a post, $g^3$, on the beam $A^3$, in front of and at a short distance from the post F'. The controlling-arm is pivoted to the reduced upper end of the post $g^3$ and rests on a shoulder, as plainly shown by the drawings, and an inclined brace or downwardly-diverging fork, $g^4$, of the arm engages the post below its upper end, and is fitted to swing freely about it. By forking the controlling-arm it is prevented from vibrating vertically. Obviously a single long bearing or sleeve fitted to the post $g^3$ and resting at bottom on a shoulder or collar would answer the same purpose. A series of downwardly-bent spurs or inclined pointed pins, $g^5$, are fixed in the outer arm or tooth, G', of the gatherer or compressor-head, so as to catch hold of the grain and cause it to follow the movements of the gatherer.

It will readily be understood that when the proper vibratory motion is imparted to the outer end of the lever $G^2$ the compressor-head is caused to move both lengthwise and crosswise of the grain-receptacle, or reciprocate in a curved path, moving the grain backward and toward the grain-guard F. The spurs $g^5$ take hold of the grain, particularly those stalks that are nearest the shoe or inner front corner of the platform, where the least impetus is imparted to the grain by the rake, and insure its proper placing upon the grain-receptacle.

In the drawings the compressor is shown in its stationary or inoperative position, ready to act upon the grain when delivered from the reaper-platform, and when the clutch mechanism is thrown into gear, as before described. The main actuating-gear or large bevel-wheel E, by the revolution of which all parts of the binding mechanism proper, as well as the compressor, are operated, is in this instance mounted upon the outer end of a doubly-cranked driving-shaft, H, and outside the binder-frame. Suitable bearings, H' H², secured respectively to the beam A³ and bar A, support this main shaft H, and the wheel E is fixed to turn with it. The cranks $h\ h'$ of the driving-shaft project therefrom at or about a quadrant apart, or at a right angle to each other, so that with the one crank projecting in a given direction a quarter-revolution of the shaft will bring the other crank into position to project in the same direction.

A rocking binder-arm, supporting-standard, or vertically-vibrating post, I, of a well-known type is fixedly mounted or keyed at its lower end by a sleeve, $i$, on a rock-shaft, I', so that it may rock with this shaft. The post may thus be given the usual vibratory motion on its support. The post plays just outside of the main support or tubular beam A³ of the binder-frame, and in a plane parallel therewith. A pitman or connecting-rod, H³, jointed at its opposite ends in suitable way, respectively, with the inner crank, $h$, of the two-throw cranked driving-shaft, and with a stud, $h^2$, on the binder-arm supporting-post, serves to rock this post. The shaft or axis I² of a binder-arm, I³, is mounted loosely in an overhanging sleeve-bearing or fixed tube, I⁴, carried by the post I, and projecting inwardly or laterally therefrom over the binding-platform. This long sleeve-bearing also projects outwardly from the post a short distance, and the shaft I² on its outer end has fixed to it a toothed arc or segment, H⁴, of a gear-wheel. In this instance an arc comprising a little more than half of a complete spur-gear is shown, the balance of the wheel being omitted as useless.

The connecting-rod or pitman G³ for actuating the compressor G is jointed to the outer end of a fixed stud-shaft or outwardly-projecting arm, $h^3$, on the post I below the gear-segment H⁴. A pinion, $h^4$, meshing with the segment H⁴, is loosely mounted on the stud-shaft $h^3$. Separate arms or studs for the pinion $h^4$ and connecting-rod G³ may be provided on the post I. A gear-segment or toothed arc, J, engaging the pinion $h^4$, is mounted loosely on the rock-shaft I' near its outer bearing, $i'$, in the binder-frame bar A. This arc J is of considerably greater radius than the gear-segment H⁴, and consequently constitutes much less than half a circle.

The crank $h'$ of the driving-shaft H is suitably connected by the rod or pitman J' with the gear-segment J.

The rock-shaft I' is supported at its inner end in a suitable bearing, $i^2$, beneath the binding-platform.

From the above description, aided by the drawings, particularly Fig. 26, it will be seen that the motion of the binder-arm is a peculiar one, its eye, needle, or outer end describing a complicated curve during the travel of the arm, the speed of which varies to best suit it to the work to be done. Two motions are imparted to the binder-arm—the one about its own axis, or independently of the movements of the supporting-post, and the other with the post as it vibrates. The speed of oscillation of the binder-arm about its own axis varies. The motion of the binder-arm as it is carried by the post in its oscillations co-operates with the swing of the arm about its axis to direct the movement of the arm at its needle end or point, and to some extent to determine its speed.

The starting positions of the parts, as the mechanism is in this instance timed, is represented by Figs. 1, 2, and 3, the operating devices having paused in these positions after a previous actuation. By referring to the diagram Fig. 26 and noting the positions of the cranks of the driving-shaft H, the crank $h$ of which is on or about its dead-center, and of the binder-arm-actuating gearing, it will be understood that for about the first six-eighths of a revolution of the driving-shaft the binder-arm moves from 1 to 7 quite rapidly. During next to the final eighth of a revolution of the driving-shaft, and while the binder-arm point is describing that portion of its path between 7 and 8, the arm moves slowly, being then compressing the bundle of grain and presenting the cord to the knotter; and from 8 to 1, or just before finishing its movement, the binder-arm moves so slightly as to be, practically considered, at rest for the proper engagement of the cord by the knotter, as will in place be described. The path of the binder-arm point on the inward movement beneath the platform approximates a straight line.

The bearing $i'$ for the outer end of the rock-shaft I' supports the vertical stud-shaft or axle $k$ of a horizontally-vibrating bevel-gear segment or toothed rack, K, which meshes with and is operated by a similar segmental rack, K', fastened on the sleeve or hub of the toothed arc J, loosely mounted on the rock-shaft. An arm, K², fast to the shaft $k$ of the driven rack K, and a link or pitman, $j$, jointing it to a rod, $k'$, serve to reciprocate a toothed bar or rack-arm, K³, beneath the binding-platform. A guide, $k^2$, for the rack shank or rod $k'$ and other suitable guideways, $j'$, serve to maintain the rack-bar in proper position as it is reciprocated by the motions of the actuating-gear K imparted from the cranked driving-shaft H. The reciprocating rack works at its inner end in and crosswise of a trough-like housing or casing, $K^4$, for the knotter and auxiliary devices. A slotted removable cover, $k^3$, protects the mechanism at top, as usual. The rack-bar $K^3$ engages a pinion, $k^4$, for actuating a knotting device peculiar in its construction and operation, and now to be described.

What I designate a "double spiral knotter" is composed of two spiral arms, L L', resembling somewhat a skeleton-screw, the knotter having a longitudinal central opening, as though the spirals were formed by coiling or properly twisting two unconnected bars in close contact about a mandrel, so that their adjacent surfaces would touch throughout but not bind, and then removing the mandrel. Figs. 21, 22, and 23 represent exaggerated or forced views of these spirals, which are thus shown separated, instead of being contiguous at their adjacent sides, to fully illustrate peculiarities which could not well be otherwise clearly brought out or explained. The end of the spiral arm L is hooked, as at $l$, has a longitudinal central tongue or rib, $l'$, and recesses or depressions $l^2$ $l^2$ at the sides of this rib. The other member, L', of the spiral knotter has a central longitudinal groove or cavity, $l^3$, in and near its end, into which the rib or tongue $l'$ of the other member fits and works, and side tongues or ribs, $l^4$ $l^4$, for fitting the depressions $l^2$ $l^2$ in the adjacent surface of the spiral L. These spirals have imparted to them a motion of rotation and reciprocation, or a screw motion, and remain, except at their outer ends, in contact throughout their operations. At times they are caused to rotate and reciprocate together, and at other times one moves slower or remains at rest while the other moves or slides along in contact with it. These different movements are given the double spiral knotter in order that it may cross or hook over the cord, engage or catch hold of it, pull on it, and release it, as will fully be explained farther on.

The conjoint movements, due to rotation and endwise motion together, and the differential movements, due to slowing or stopping the motion of one spiral while the other is working, are in this instance imparted to the two members of the knotter in the manner and by the means as follows:

The spiral L rigidly joins with or is attached at its heel or inner end to a round shaft or shank, M, and the spiral L' is similarly secured to a sleeve-shank or tube, M', fitting around the shank M. The shank M of the foremost or hook-ended spiral, L, extends endwise through the tubular shank M' of the spiral L', and this latter shank is mounted to turn in a sleeve or bearing, $m$, just in front of the pinion $k^4$. A standard secured at its lower end to the base-plate of the casing $K^4$ supports this bearing $m$. The pinion $k^4$, actuated in this instance by the rack-bar $K^3$, before described, is fast on the front end of a turning slotted case or rotating cam-shell, $M^2$, (best shown in Figs. 10 and 11.) This cam-shell turns at its front end about the shank M', and at its opposite end is supported about the shank M, which, at its outer end, projects through a bearing, $m'$, at the projecting rear end of the casing or housing $K^4$. The shank M turns as well as reciprocates in this bearing $m'$, and the shank M' has similar motions in the bearing $m$; but the cam-shell $M^2$ has no endwise movement.

The sleeve-shank M' terminates at its rear end within the cam-shell, and has an annular shoulder or fast collar, $m^2$, provided with a short stud and roller or pin, $m^3$. A coiled spring, $M^3$, is fastened at its opposite ends, respectively, to the collar-head or shoulder of the outer or sleeve shank, M', and to a shoulder or collar, $M^4$, fast on the inner shank, M, in front of the rear bearing of the cam-shell. A stud and roller or pin, $m^4$, on this collar $M^4$ engages an inclined slot or camway, $M^5$, in the cam-shell, while the pin $m^3$ of the sleeve-shank of the knotter engages with a camway formed by an irregularly-inclined edge-track of the cam-shell. The tendency of the spring $M^3$ is to hold the two spirals of the knotter in contact and closed together or interlocked at their ends by the engagement of the hook on the one spiral with the groove on the other; and this spring acts with a tendency to keep the pin $m^3$ in contact with the cam-track or edge of the cam-shell.

A spiral guideway or segment of a female screw, N, the thread of which exactly corresponds in pitch with that of the spirals L L', and is of the proper width to receive the two together, controls the movements of the knotter and incidentally insures the proper contact of the spirals, thus preventing the possibility of their improper separation by any unusual strain. The spiral guideway N has wings $n$ $n$, between which the spirals work, as plainly shown in a number of figures of the drawings. This spiral guideway is, in this instance, mounted on or formed with and projects rearwardly from the fixed arm or jaw N' of a pair of cord-clamps, N' $N^2$, which, together with other devices co-operating with the double spiral knotter and the binder-arm, will hereinafter in detail be described.

Concerning the above-described means for actuating the knotter and the movements imparted to the knotter, the following explanation of the operation may here be given, starting, say, with the parts in the positions in which they are shown in Figs. 10 and 11, and with the binder-arm swinging inward to the position represented by Fig. 13: As the rack $K^3$ begins its outward stroke and turns the cam-shell $M^2$ by the pinion $k^4$, the first movement imparted to the knotter is a rotary advancing or screw motion, simultaneously given to both the spirals to advance them together, as the studs $m^4$ and $m^3$ engage respectively the slot $M^5$ and the cam-edge $n'$ $n^2$ $n^3$. At the start the ends of the spirals are separated, or the catch at the point of the knotter is open, it should be noticed, the ends of the spirals occupying relative positions, such as those in which they are left after having tied a knot and released the string. The spirals maintain these relative positions until the inclination $n^2$ of the edge-track of the cam-shell is being passed over by the pin $m^3$, which previously slid on the reverse incline $n'$. The cut-away or inclined portion $n^2$ of the track allows an increase of the speed of rotation of the spiral L', so that it slides along the spiral L, the speed of rotation of which remains unchanged and closes the cord-engaging ends of the knotter. The spring $M^3$, connecting the shanks M and M' of the spirals, acts to increase the speed of rotation of the spiral L' and to keep the stud $m^3$ up to the incline. The positions in which the parts are represented in Fig. 13 are those occupied at or about the time the spirals have closed at their ends. The increased speed in the rotation of the grooved-ended spiral terminates when the stud $m^3$ comes in contact with the inclined portion $n^3$ of the cam-shell track, and the spiral ends, being in their interlocking or closed positions, remain so, both spirals rotating at the same rate of speed until the pin $m^3$ strikes a vibrating stop-arm or temporarily-acting arrester, O, to be in detail described hereinafter. The result of thus arresting the rotary motion of the spiral L' is to cause the moving spiral L to advance at its end beyond the end of the other spiral, and the cord-engaging ends of the knotter are adjusted to take hold of the cord, these ends being thus again brought into the positions relative to each other as represented in Fig. 11. At or immediately before the time of completing the advance movement of the knotter by the rotation of the pinion $k^4$ in one direction (see Fig. 15) the stud-arrester O is vibrated and releases the stud $m^3$, which, because of the action of the spring $M^3$, quickly moves toward the inclined track of the cam-shell, thus causing a quick partial rotation and consequent sliding motion of the spiral L' on the spiral L, closing or interlocking them at their ends to hold the cord. On the reverse stroke of the rack, and the rotation of the pinion in the direction opposite to that in which it was rotated to actuate the spirals as they were advanced, the two spirals move back together until the stud $m^3$ comes in contact with the portion $n^2$ of the cam-track, when the spiral ends open or unlock to release the cord, and maintain such relative positions to the end of their movement, or until the starting-point is reached.

It is apparent that, instead of giving to the spiral L' the movements due to varying the speed and to intermitting the operation by the action of the arrester, irregular movements may be given to the spiral L, and that either spiral may be carried on the sleeve-shank, and that either spiral may have the hook end.

The changes in the cam-shell connections with the shanks of the spirals and in the arrangement of the spring $M^3$ required by these modifications are obvious.

The cord-holders or clamps N' N² are of peculiar construction. One of them—in this instance the fixed jaw N'—has a recess or groove in its face to match a correspondingly-shaped tongue or rib, $n^4$, on the movable jaw N². Obviously a secure bite or gripe on the cord results from this construction, for the adjacent surfaces of the clamp-jaws, when brought against the string, give it a bend, as it has to follow the circuitous form of the griping-surface, and the frictional hold on the cord is ample to retain it in the jaws without so tightly clamping it as to abrade or cut it. The fixed clamping-jaw N' is mounted on a post or shank, $N^3$, suitably supported on the base-plate of the box or inclosing-case $K^4$, and the movable jaw N² has a bowed or yoke-like shank, $N^4$, which is secured at its bend, or the junction of its forks, on a rock-shaft, $N^5$, mounted at one end in a bearing in the post $N^3$ of the fixed jaw, and at its other end supported in a suitable bearing at the side and near the base of the standard $j^2$, which supports the bearing m for the knotter-shanks.

A coiled spring, $n^5$, is suitably secured at one end by attachment to the binder-frame, as shown, or in equivalent way, and is connected at its other end with the heel end or top of the fork $n^6$ of bent shank $N^4$ of the clamp-jaw N². This spring acts with a tendency to close the jaws. The opening of the jaws is due to the action of a striker-slide or tappet, P, fast on the under side of the rack-bar $K^3$, operating on the end of a lever, P', on the rock-shaft $N^5$ as the rack slides back and forth.

It will readily be understood that during the times—once on each stroke of the rack—the tappet-slide acts on the lever of the rock-shaft the cord-clamp is open, and at other times the clamp is closed by the force of the spring $n^5$ drawing on the arm $n^6$ of the shank of the movable clamp-jaw and rocking the jaw toward and against the fixed jaw.

The clamping-jaws proper—that is, the clamps when considered simply as such and apart from their shanks—are arched, each resembling somewhat a horseshoe in shape. Whether the jaws are opened or closed, there is a space left between their shanks by means of a bend or recess in the shank of the movable jaw sufficient for the binder-arm to work freely in as it rocks and moves endwise at and near its point between them.

A cord-rest is formed by a stud, p, on the fixed jaw N' of the clamp, at or near one heel of the horseshoe—that is, at the end of the jaw proper or clamp-head opposite that springing from or terminating in the shank, and a horn or curved arm, p', constituting a cord-guider, projects forwardly and downwardly from the opposite side of this fixed jaw. From its inner end or heel outwardly for a portion of its length the horn is inclined or curved vertically, and at its inner side is in or about the vertical plane of one side of the binder-arm slot in the casing-cover, in which plane the inner surface or griping-face of the fixed jaw is also located. At and near its outer end the horn is curved horizontally, so as to project away from the path of travel of the binder-arm and prevent the possibility of the cord passing to or along the back instead of by the front or inner side of the horn to the clamping-jaw. The inner edge of the shank $N^3$ of the fixed jaw also acts as a cord-guider, being made flush with the griping-face of the jaw, or nearly so, for that pupose. The clamp-jaw $N^2$ has an incline or cord-director, $n^7$, to direct the cord to the guiding-shank $N^3$.

A cord guider or controller, $p^2$, is actuated by the movable jaw $N^2$ of the clamp, and as shown is formed by a spring-encircled or endwise playing and yielding rod passing at one end through a bearing or guiding-opening, $p^5$, in an arm or bracket projecting forwardly from that heel of the horseshoe, or from the base of that side of the clamp-head opposite that which is in this instance alone connected to its shank. Obviously both heels might be connected with the shank. At its outer end the rod $p^2$ is loosely supported in a suitable bearing or guiding-socket at $p^3$. The spring $p^4$ is fast to or bears at one end against a stop-shoulder or fixed collar on the rod just outside its bearing in the clamp-head arm, and at its opposite end the spring bears against the bracket in which the guide-socket $p^3$ is formed. It will be seen that the rod is limited in its movement in one way by its collar and allowed to yield in the other direction by its spring. The two bearing-sockets $p^3$ and $p^5$, in which the rod rests, are large enough to allow of the proper vertical movements or rocking motion of the rod therein as the clamping-jaw $N^2$ oscillates in its movements to and from the fixed jaw of the cord-clamp.

To increase the strength of the jaws $N'$ $N^2$, they may be of concave or cup form instead of the skeleton form, as shown, but with the horseshoe or inverted-U-shaped clamping-surfaces. The clamp-heads may be forked, or each given the form which would be produced by cutting out the top or curved upper part, and each fork supported by its shank.

A pair of cord nippers or tongs, Q Q', for engaging the cord and holding its end, are represented in part by exaggerated or forced views in Figs. 24 and 25. In this way are clearly brought out peculiarities which it would be difficult otherwise to show or explain. The nipper-arm or member Q of the tongs has a centrally-arranged and longitudinally or vertically extending curved or inclined edged rib or tongue, $q$, projecting above its top, and the other nipper-arm, Q', is hook-ended and provided with a longitudinal central tongue or groove, $q'$, to receive and work in register with the tongue on the other member of the tongs.

A cutter, $Q^2$, is carried by the member Q of the nippers or pair of cord-holding tongs. The cutter has a curved knife-edge point, and is pivoted at $q^2$ to the nipper-arm. Its arm or shank is slotted longitudinally at its heel, and engages with a fixed pin or roller-stud, $q^3$, shown as projecting from the side of a post, $Q^3$, supported at its base on the base-plate of the casing $K^4$. The movements, as explained farther on, of the nipper-arm to which the cutter is pivoted and the slot or guideway sliding on the pin $q^3$ give a rocking or shearing motion to the cutter. Those of the devices above described for co-operating with the binder-arm, the knotter, and the cord-clamps which are not operated by the rack-bar $K^3$ are in this instance operated by connecting mechanism actuated from the rocking post I of the binder-arm, as now to be described.

A stud, $r$, on the inside of the rocking post I, near its lower end, has a ball-and-socket or similar jointed connection, $r'$, with the inner end of a rod, R, having a like jointed connection at its outer end with one end of an arm or lever, R', formed with or fastened to the top of a vertical axle or pivot mounted to turn horizontally in a suitable bearing in the outer end of a bracket, $R^2$, secured to the tubular frame-beam $A^3$. At its lower end this pivot has rigidly connected with it a lever-arm, $R^3$, projecting forwardly and at a right angle with the arm R', and jointed at its outer end with one end of a link or pitman-rod, $r^2$, which is pivoted at its opposite end, $r^3$, to a shank or guide-rod, $R^4$, of a reciprocating cam-slotted head or long curved link, $R^5$.

A guideway, $r^4$, for the shank-rod and other proper guide-bearings, $r^5$, for the flanged base of the sliding cam-slotted head insure its proper to-and-fro movement as it is reciprocated by the motion imparted by the standard I as it is vibrated.

The before-referred-to vibrating stop or arrester O for the stud $m^3$ of the knotter-shank M' is automatically operated by means of a curved shoulder or incline, $o$, on the under side of the cam-head $R^5$, at its heel end.

By reference to Figs. 6, 10, 11, 12, and 20 (particularly the first two of those figures) it will be seen that when the shoulder $o$ strikes against the inclined toe or curved end $o'$ of the outer arm of an elbow-lever the lever is vibrated. This lever is pivoted upon a stud, O', suitably fixed to the bottom of the casing $K^4$. The inner arm, $o^2$, of the lever—which is, of course, formed with or rigidly attached to the toe-ended or outer arm—is connected near its outer end with one end of a spring, $O^2$, suitably fixed at its opposite end. The constant tendency of this spring is to pull the arm $o^2$ of the elbow-lever in a direction the opposite to that in which it moves when the lever is acted on by the shoulder $o$. A jointed arm or link, $O^3$, connects the elbow-lever arm $o^2$ and a lever-arm, $O^4$, rigidly connected with the pivot of the arrester-arm O. As the mechanism is in this instance timed, the arm O is automatically operated at about the middle of the pull or return-stroke of the cam-head, and is kept swung out of the way of the stud $m^3$ until the middle of the advance movement or inward or thrusting stroke of the cam-slotted head.

The way in which the tongs or cord-nippers Q Q' are mounted and the manner of actuating them and the cutter $Q^2$ will best be understood by reference to Figs. 6, 10, 12, 16, and 19, in connection with the following detailed description.

The hook-ended and grooved arm or section Q' of the nippers is fastened by the shank S on a rock-shaft, S', parallel with the before-described rock-shaft $N^5$ of the movable clamp-jaw $N^2$, and outside thereof. This rock-shaft S' is mounted to oscillate in suitable end bearings, one at T and the other in the top of the arched post T', overhanging the link $O^3$, for operating the arrester-arm O. The elbow-lever spring $O^2$ is attached to this post. (See Figs. 10 and 20.) The member Q of the cord-nippers is mounted by its shank $S^2$ and a sleeve or long bearing, $S^3$, on the rock-shaft S'. The sleeve $S^3$ of the nipper-arm Q turns on the rock-shaft S', while the nipper-arm Q' rocks with the shaft. This sleeve and shaft are connected by a coiled spring, $s$, encircling the sleeve and secured at its opposite ends respectively to the sleeve and to the rock-shaft. In Fig. 10 the spring is clearly shown as fastened at one end to a lug, $s'$, on the sleeve $S^3$ and at the other end to a screw, $s^2$, secured to the rock-shaft. This screw also serves to secure a shoulder or collar, $s^3$, on the rock-shaft between the bearing T' and the outer end of the sleeve $S^3$ of the shank $S^2$. This spring, connecting the sleeve and rock-shaft, acts on the nipper-arms or tongs Q Q' with a tendency to close them. The spring is of strength sufficient to insure a proper gripe on the binding-string at proper times, as will presently be understood, and yet admit of the self-adjustment of the nippers to suit variations in the size of the cord. The bent or angular formation of the shanks S and $S^2$ and the way in which they are mounted upon the rock-shaft, as shown, allow of the proper movements being given them and prevent interference between them and the binder-arm, and the location of the rock-shaft S' is such that the tongs at the lower limit of their movement (see Fig. 16) are on the same side of the path of the needle end of the binder-arm as is the guide-horn $p'$, while on their upward rock the member Q' of the tongs passes out from under the horn and across and above this path between the cord-controller $p^2$ and clamp-head $N^2$, (see Fig. 19,) so as to engage the cord in returning to the position shown by Fig. 16.

A pin or roller-stud, $t$, in the side of the shank S of the hooked arm Q' of the nippers is operated upon by the slot or way in the reciprocated cam-head $R^5$. As will be seen by reference to Figs. 5 and 12, the cam-slot is straight and extends horizontally for the greater portion of its length from its shank or heel end toward its opposite end, where it curves upward, and then again extends horizontally, or nearly so, for a short distance to its termination. At the outer end of the cam-head—the end opposite that which connects with the rod or shank $R^4$—a curved spring-supported rocking tappet or yielding tripper, $T^2$, is mounted, for operating at certain times on the member Q of the tongs to counteract the tendency of the shank-spring $s$ to close it, and by overcoming this spring rock the member Q away from the member Q' and open the nippers. This rocking tappet or yielding tripper, as clearly shown in Figs. 10 and 12 and elsewhere in the drawings, is mounted on the inner end of a stud, $t'$, in the cam-head. The tripper is rigidly connected with the stud, which rocks in its bearing in the cam-head, and is connected therewith by a coiled spring, $t^2$, so as to have a tendency to rock upward at its toe or curved point to the extent of the movement allowed it by a pin-and-slot connection, $t^3$, between it and the cam-head.

A stud and roller or pin, $u$, projecting laterally from an arm or lug, U, on the tongs-section Q, rides under the tripper $T^2$ when pressed against by its curved toe, and thus causes a separation of the arms of the tongs. After sliding in contact with the under side of the tripper until the heel end of the tripper has passed beyond it, this stud ascends as the shank-spring rocks the member Q of the tongs toward the other arm, Q'. On the reverse motion of the cam-head the tripper is carried under the stud $u$.

A clearer finger or spring, V, bears upon the spiral knotter to free the cord from it at the proper time, and thus prevent the possibility of the cord passing too far along the knotter for proper work. This spring cord-clearer is shown as formed by a bent or bowed plate-spring fastened at its shank end on top of the fixed section N' of the cord-clamp and projecting at its free end into the opening of the clamp, or beneath and near the top of the arched or horseshoe-like head of the clamp.

As in this instance timed and organized, the binding mechanism is caused to act twice to gather and bind each bundle, part of the work being done at each actuation. By a different timing of the mechanism more or less of the work could obviously be accomplished at either actuation than is in this instance performed; or obviously the entire operations of adjusting the cord, knotting it, and severing it might be performed at one actuation. I however prefer the particular organization and timing of the mechanism as in this instance shown, and especially suited for a plane-surfaced grain-receptacle and that type of binder with which my improvements are, by preference, employed, so as to operate in unison in the following manner, starting with the parts in the positions in which they are shown in Figs. 1, 2, and 3, and about as represented in Fig. 13, in which latter figure the letter X indicates about the position at which the point of the binder-arm stops and rests during the intervals in the operations of the mechanism as now timed:

As shown in Fig. 13, the end of the back part of the cord is firmly held by the cord-tongs, and the cord passes over and bears on the rest $p$, while the front or binder-arm part of the cord passes beneath said rest with the spiral knotter crossing or hooking under it. The clamps, at their opposite sides, now hold the cord in proper position, the two parts of the cord crossing, as shown, and this position having been given, as will be explained in place, and the cord-controller rod $p^2$ is held back against the pressure of its spring by the contact of its end with the binder-arm side. It should be noticed that the clamps hold the band ends or each portion of the cord separately and at points above where the ends cross or meet, or between the bundle and the meeting-point. The result is that no strain due to the expansive tendency of the bundle is brought on the knotting apparatus; the minimum amount of cord forms the band, as there is but very little slack—practically none—in the band to be taken up when the clamps open, and consequently an excessive condensation of the bundle preliminary to knotting is avoided, and comparatively weak cord can be used.

Assuming a bundle to be in position and encompassed and the clutch-gearing to be operated to start the mechanism, the spiral knotter advances and enters the arched space or opening in the clamps at its end (see Fig. 14) as the binder-arm withdraws. The diagram Fig. 14$^a$ shows the result of the operation on the cord at this stage in the formation of the knot, a loop being formed in the cord between the end of the binder-arm and the rest $p$, the cord being under tension, as usual. By the time the positions of the parts represented by Figs. 15 and 16 are reached (previous to which time the cord-controller or spring-actuated rod $p^2$ has moved into position and projects beneath the horn $p'$, to be above the binder-arm part of the cord later) the operation of knotting has progressed to the point at which the form as represented by Fig. 15$^a$ is given the cord. The cord-clamps and the nippers still have hold of the cord, and at this stage of the operation the hook-ended spiral of the knotter has advanced on the other member of the spiral to project its hook and engage the cord close to the nippers. Next, by the vibration of the arm O the groove-ended spiral L' is allowed to move forward or advance on the spiral L, and the cord is griped and firmly held by the large clamping-surface given by the peculiar tongue-and-groove formation of the spiral ends, which results in giving to the cord a sort of half turn or bend between the ends of the spirals. A very slow motion—practically amounting to a pause—is imparted to the spirals at the time when, having griped the cord, they are ready to begin their reverse movement together, and this is due not only to the dead-point, or time occupied in changing the motion of the spirals from forward to backward, but also to the motion of the actuating-crank of the shaft H, which crank is on the dead-center at the time of the finish of the advance movement and starting of the retrograde movement of the spiral knotter. In this way is afforded opportunity for the knotter to engage the cord end held by the tongs before it is released and for the tongs to release the cord before it is unduly strained by the reverse motion of the knotter. The cord looped about the knotter-spirals passes under the spring-finger V as the spirals move into the position shown by Fig. 15. The tension on the cord and its frictional contact with the spirals are sufficient to carry it under the yielding finger, the function of which is to prevent possibility of the cord clinging improperly to or being carried too far back by the knotter on its retrograde movement. As the knotter griping the cord is retracted by rotating the cam-shell M$^2$ in the direction opposite that in which it turned to advance the spirals, the tongs or gripers having released the cord end, it is carried in a bow or loop through the loop before formed about the knotter. (See Figs. 17 and 17$^a$.) The spring finger or clearer V performs its function at this time. The cord-holder or clamping-jaws N' N$^2$ are caused to release the cord by the action of the rack K$^3$ at the proper time on the jaw N$^2$ by connections, as before described.

In Fig. 19 parts are represented in positions occupied by them shortly after the time they occupy the positions in which they are partly shown in Fig. 17 and a little before that stage in the operation is reached which is represented by the diagram Fig. 18. The tongs or gripers Q Q', after releasing the end of the cord caught by the knotter, engage the binder-arm end of the cord, the hook-ended arm of the tongs moving first up to the position shown by Fig. 19, and then drawing down upon and griping the cord against the other member of the tongs. At this point the clamps open. During the continued descent of the tongs the cord is severed by the cutter Q$^2$, and finally the opening of the knotter releases the bundle.

Figs. 10, 11, and 12 show the positions assumed by the parts just after severing the cord. During the remainder of the operation, to bring the parts to the stopping and starting positions, Fig. 13, the clamps remain open until the cord has been properly introduced, and then close, the tongs hold the cord end, the cord-stop or controller-rod $p^2$ is out of the way of the binder-arm, and the horn $p'$ insures the proper entrance of the cord to the clamps, &c. The new bundle brought in by the binder-arm displaces the one before bound, if still on the platform, and the knotter has been started by this final movement to pass around or under the cord, ready for a repetition of the before-described operations of the parts on the next actuation.

It is out of abundant caution only that I by preference so time the workings of the knotter, the clamps, and the tongs as to hold onto the cord by the first and the last for an instant after the clamps have opened, for in practice so far a perfect knot has in every instance been formed without assistance by the pull due to the expansion of the bundle. The slack required to form the knot is partly taken out of the band, instead of being wholly provided for by one or both ends of the cord—that is to say, the point at which the cord is first crossed and interlooped is more remote from the bundle than the point where the knot is finally formed. This will be apparent by inspection of Fig. 18 and preceding figures of the drawings, the cord in Fig. 18 being straightened between the clamp sides, while before the final operation or knotting and the completion of the knot the cord ends were crossed diagonally, the one above and the other below the cord-rest $p$.

The orbit or path of movement of the needle end or point of the binder-arm I³ resembles more or less nearly the irregular paths usually traveled by the binder-arm in machines of the type to which the binder-arm is shown as applied in the drawings; but I am not aware of any mechanism for actuating the binder-arm similar to that hereinbefore described, by which the desirable varying speeds and differential movements are given the arm and by which the orbit of a needle-arm pivoted to a vibrating post is adapted to gather the grain on a level platform or receptacle. The binder arm has two forks or curved rake-like teeth, V′ V′, to aid in gathering the grain.

The cord-spool V², with spring bearing upon it, as usual, to prevent its accidental or too free rotation, is mounted on a bent arm, V³, fast to the binder-arm bearing-sleeve I⁴. The cord passes upward from the spool to an eye in the top of the arm V³, passing under a yieldingly-bearing presser or tension-griper, r, on its way to this eye. This tension-griper is formed by a plate-spring bent and adjustably secured in place, as shown in Figs. 1 and 2. A screw-stud passing through the spring-plate and provided with a pinch-nut, r′, outside the plate, a steady-pin, r², and lips on the upper end of the plate embracing the arm V³ serve to secure the tension-griper in place and admit of its ready adjustment to bear with more or less force on the string. The string passes from the eye in the arm V³, just over the tension-griper, to the outer end of a rocking take-up arm, W, pivoted at its opposite end to one end of the spool-shaft fixed at the angle of the arm V³. The cord passes round a sheave or pulley, $w$, rotating on the outer rounded end of the take-up arm. From this pulley the cord passes back over a pulley, $w'$, hung in depending bearings in the bent or overhanging upper end of the arm V³. From this pulley the cord passes through an eye at $w^2$ in the binder-arm, thence along a longitudinal groove to and through the eye $w^3$ at the point or needle end of the binder-arm.

A curved arm or heel-projection, W′, at the lower end of the take-up arm is connected by a spring, $y$, with the supporting-arm V³, and acts with a tendency to rock the outer end of the take-up away from the arm V³. A wiper-projection or cam, Y, at the heel of the binder-arm acts on the heel-arm of the take-up to limit its play and prevent it from yielding during the time when the final compression of the gavel is taking place and the knotting devices are operating. When the cam dogs the take-up the full benefit of the tension-griper is secured, as the further supply of cord comes from the spool and under the strain necessary to draw it past the tension-griper, thus insuring a close encircling of the bundle by the cord.

Among the modifications or obvious mechanical changes which may be made in my improvements without departure from my invention are the following:

The knotter-spirals may lie the one within the other, or as though formed by two rods placed one on the other, thus bringing adjacent to each other outer and inner surfaces instead of front and rear surfaces, as shown in the drawings. One of the spirals of the knotter may be tubular and the other spiral work in it.

The cord holders or clamps may be self-accommodating to provide for properly engaging the two ends of the band, regardless of variations in the size of the cord. For instance, one of the jaws may be padded or have a yielding griping-surface.

Instead of the gear-segments H⁴ and J and the intermediate pinion, $h^4$, two sprocket-wheels and a chain connecting them may be substituted, with precisely the same results in the combination described, the chain taking the place of the intermediate pinion in gearing the parts together; or the wheels or segments may be connected in other well-known equivalent way—as, for instance, by employing two chains or bands of corresponding length, fastened side by side to the two wheels at their opposite ends, over which the bands pass in contrary directions.

The grain guard or regulator F may be similarly supported by radius-links at both ends, instead of having such support at one end only. The pin and series of holes or equivalent detent devices would still serve to secure the grain-guard in its adjusted position.

I claim as of my own invention—

1. The combination, with the binder-frame or supplemental binding attachment for flexible connection to and in rear of a reaper, at the side of the grain-platform thereof, and with its inner edge adjacent to the delivery side or grain-discharging inner edge of said platform, as described, of the universal joint, constituting the sole medium of attachment of the binder-frame to the grain-platform, (or finger-beam or shoe,) said joint serving to directly connect the inner front corner of the binder-frame to the corresponding corner of the reaper-platform, (or described adjacent point,) substantially as and for the purpose hereinbefore set forth.

2. The binder-frame or supplemental binding attachment provided with the universal joint at its inner front corner to connect it with the corresponding corner of a reaper-platform, and having the flexible draft and suspending connections for attaching it at front to the reaper, substantially as and for the purpose hereinbefore set forth.

3. The binder-frame or supplemental binding attachment provided at its front end with the flexible draft and suspending connections for attachment to a reaper, having the universal joint for connecting its inner front corner to the corresponding corner of the reaper-platform, and supported at rear upon the caster-wheel, substantially as hereinbefore set forth.

4. The binder-frame or supplemental binding attachment having the universal joint for connecting its inner front corner to the corresponding corner of a reaper-platform, and provided with the longitudinally-balancing and supporting beam having the chain or suspending-support, by which to connect its front end with the reaper, substantially as and for the purpose hereinbefore set forth.

5. The combination of the reaper-platform, the binder-frame having the universal joint connecting it at its inner front corner to the reaper-platform at or near the shoe, the rigidly-attached longitudinal supporting balancing-beam, and the caster-wheel at the rear of said beam, and the chain or link at the front thereof, by which to suspend the binder-frame in rear of the reaper, substantially as and for the purpose hereinbefore set forth.

6. The combination, substantially as hereinbefore set forth, of the binder-frame or supplemental binding attachment, the caster-wheel at the rear thereof, the universal-joint attachment at the inner front corner of the binder-frame, the drag-bar at the outer front corner thereof, and the chain or flexible supporting-connection for the front of the binder-frame, intermediate its drag-bar and universal-joint attachments and in line with the caster-wheel, for the purpose set forth.

7. The combination, substantially as hereinbefore set forth, of the frame-bars, the balancing longitudinal supporting-beam, the binding-platform or grain-receptacle inside said beam, the binder-actuating gearing outside thereof, the caster-wheel supporting said beam at its rear end, the chain or suspending-support at the front thereof, the universal-joint attachment at the inner front corner of the binder-frame, and the drag-bar at the opposite front corner thereof.

8. The combination, substantially as hereinbefore set forth, of the binder-frame or supplemental binding attachment, the universal joint at its inner front corner to connect it with the corresponding corner of a reaper-platform, the flexible draft and suspending connections for attaching the binder-frame to a reaper, the binding mechanism, its actuating-gearing, and the clutch-gearing for operating the binding mechanism from the reaper-gearing.

9. The combination of the binder-frame or supplemental binding attachment having the universal joint at its inner front corner, and the flexible draft and suspending connections for attaching it to a reaper and its platform, in the manner described, the binder-actuating gearing, the clutch-gearing, the clutch-shifter, and the lever with which the clutch-shifter is connected to adapt it to be operated by the rake or rakes of the reaper, substantially as and for the purpose hereinbefore set forth.

10. The combination of the rake-post, the rake, the tripping-lever beneath the heel end of the rake and operated thereby, the supplemental binding attachment, the clutch-shifter, and the cord connecting said lever and shifter, substantially as and for the purpose hereinbefore set forth.

11. The combination, substantially as hereinbefore set forth, of the reaper-platform, the binder-frame or supplemental binding attachment, the universal-joint connection between the inner front corner of said binder-frame and the corresponding corner of the reaper-platform, the rake, the tripping-lever beneath the heel end thereof and operated thereby, the clutch-gearing, the binding mechanism, and the clutch-shifter connected with said tripping-lever.

12. The combination, with a reaper, substantially as hereinbefore set forth, of the binder-frame or supplemental binding attachment, the universal-joint connection between the inner front corner of said frame and the corresponding corner of the reaper-platform, the flexible draft and suspending connections between the reaper and said frame, the binder-actuating gearing, the gear-wheel through which it is operated, the tumbling-shaft, the clutch-gearing for connecting said shaft and gear-wheel, the clutch-shifter, the lever actuated by the rake or rakes and connected with the shifter, and the dogging-lever acting on said shifter and tripped by the binder-actuating gear-wheel to automatically throw the clutch out of action and intermit the operation of the binding mechanism.

13. The combination of the pinion-carrying clutch-section mounted loosely on its shaft, the sliding section of the clutch having the worm-gear and annular groove, the spring acting on said sliding section to move it endwise the shaft, the clutch-shifter, the dogging-lever, and the gear-wheel meshing with the clutch-pinion and operating upon the dogging-lever to automatically disconnect the clutch-sections, substantially as and for the purpose hereinbefore set forth.

14. The combination, substantially as hereinbefore set forth, of the tumbling-shaft, the sliding worm-geared and annularly-grooved clutch-section thereon, the spring acting on this sliding section, the pinion-carrying clutch-section loosely mounted on the tumbling-shaft, the gear-wheel driven by the clutch-pinion, the tappet thereon, the elbow-lever acted upon by said tappet, the clutch-shifter dogged by one arm of said elbow-lever, and the spring connecting the opposite arm thereof with the pivot of the clutch-shifter, for the purpose described.

15. The combination of the binding-platform or grain-receptacle, crosswise of which the grain is swept heads foremost as delivered thereto, and the adjustable grain guard or regulator near the outer edge of said platform, substantially as and for the purpose hereinbefore set forth.

16. The combination of the grain guard or regulator, its post, and the yoke-link or radius-bars connecting the grain-guard and post, substantially as and for the purpose hereinbefore set forth.

17. The combination of the binding-platform or grain-receptacle, the grain-guard having the stud at one end for adjustment in holes arranged in a curved row in the binding-platform, the radius-bars at the opposite end of the grain-guard, and the supporting-post, substantially as and for the purpose hereinbefore set forth.

18. The combination of the binding-platform or grain-receptacle, the grain-guard near and parallel with the outer edge thereof, to arrest the grain as it is delivered thereto by being swept heads foremost from the reaper-platform crosswise of the binding-platform, and the compressor swinging in a curved path, beginning at or near the inner front corner of the binding-platform, and moving lengthwise thereof, as well as toward the grain-guard when acting on the grain, substantially as and for the purpose hereinbefore set forth.

19. The combination, substantially as hereinbefore set forth, of the reaper-platform, the binding-platform or grain-receptacle, the universal joint by which said platforms are connected at their inner front corners only, the flexible draft and suspending connections for attachment of the binding-platform at front to and in rear of the reaper, the reaper rake or rakes, and the grain-guard at or near and parallel with the outer edge of the binding-platform, to arrest the grain swept heads foremost onto and crosswise of said platform.

20. The combination of the binding-platform or grain-receptacle, the compressor vibrating about its support at or near the outer front corner of said platform and moving in a curved path and lengthwise thereof, and the binder-arm, also moving lengthwise said platform, substantially as and for the purpose hereinbefore set forth.

21. The combination of the compressor-head, the lever to which it is connected, the supporting-post about which the lever is vibrated, and the link-rod or controlling-arm, substantially as and for the purpose hereinbefore set forth.

22. The combination, substantially as hereinbefore set forth, of the vibrating binder-arm supporting-post, the oscillating binder-arm shaft loosely mounted in said post, the gear fixed on and oscillating with the binder-arm shaft, and the gear fixedly mounted to oscillate about the axis of vibration of the binder-arm supporting-post and connected with the gear on the binder-arm shaft, so as to move in a direction contrary thereto as said gears oscillate.

23. The combination, substantially as hereinbefore set forth, of the vibrating binder-arm supporting-post, its supporting shaft or pivot, the binder-arm shaft or axle loosely mounted in said post, the gear fixed on the binder-arm shaft, the gear mounted on the supporting shaft or pivot of the vibrating post and geared with the binder-arm-shaft gear, and means for independently vibrating the binder-arm post and oscillating the gear on its pivot to move said gear and that on the binder-arm shaft in opposite directions at the same time, for the purpose described.

24. The combination, substantially as hereinbefore set forth, of the binder-arm, its oscillating shaft, the vibrating post in which said shaft is loosely mounted, the gear fixed on the binder-arm shaft, the loosely-mounted pinion meshing therewith and vibrating with the binder-arm supporting-post, the gear fixedly mounted to oscillate about the axis of vibration of the supporting-post and meshing with said pinion, and means, essentially such as described, for independently moving said post and the gear which oscillates about its axis of motion.

25. The combination of the vibrating binder-arm supporting-post, the oscillating binder-arm shaft loosely mounted therein, the gear fixed on and oscillating with said shaft, the gear mounted to oscillate about the axis of vibration of the binder-arm supporting-post and geared with the gear on the binder-arm shaft, so as to oscillate in a direction contrary to that in which said binder-arm shaft oscillates, the doubly-cranked driving-shaft having its cranks at or about a quadrant apart, and the rods or pitmen connecting said cranks, respectively, with the vibrating supporting-post and the gear which oscillates about the axis of vibration of said post, these members being and operating substantially as hereinbefore set forth.

26. The combination of the binder-arm, the rocking post in which it is mounted, the compressor, its vibrating lever, and the link connecting said lever and post, substantially as and for the purpose hereinbefore set forth.

27. The spiral knotter consisting of two parallel spiral arms with their adjacent surfaces close to each other, adapted to slide the one along the other, and having imparted to them motions of reciprocation and rotation about the same axis, substantially in the manner set forth, whereby they are advanced and retracted and caused to engage and release the cord, substantially as hereinbefore set forth.

28. The double-spiral knotter consisting of the combination of two parallel spiral arms, independently mounted, with their adjacent surfaces close to each other, and adapted to slide the one along the other, grooved and hooked at their outer ends, respectively, and having imparted to them motions of reciprocation and rotation about the same axis, to advance and retract them and to interlock and disengage them at their ends, substantially as hereinbefore set forth.

29. The combination, substantially as hereinbefore set forth, of the two parallel spirals having their adjacent surfaces close to each other, and the shanks, one of which passes through the other, upon which the spirals are independently mounted, and by means of which the spirals have imparted to them motions of reciprocation and rotation about the same axis, thus advancing and retracting them and engaging and releasing the cord.

30. The combination, in a knotting device, substantially as hereinbefore set forth, of the two parallel spirals, the shanks, one within the other, upon which the spirals are independently mounted, and the spring connecting the shanks.

31. The combination, substantially as hereinbefore set forth, of the knotter-spirals, their independent shanks, the spring connecting them, and the cam-shell operating on the shanks.

32. The combination of the knotter-spirals, their independent shanks, the spring connecting them, the cam-shell, the studs on the shanks engaging the cam-shell, and the arrester-lever operating in connection with the stud on one of the shanks, substantially as and for the purpose hereinbefore set forth.

33. The combination, substantially as hereinbefore set forth, of the parallel knotter-spirals, the supporting-shanks to which they are independently attached at their heel ends, and by which they have imparted to them motions of rotation and reciprocation, and the guideway in which the spirals slide, for the purpose described.

34. The combination, substantially as hereinbefore set forth, of the parallel knotter-spirals, the spring-connected shanks upon which they are mounted, the rotary cam-shell operating upon the shanks, the pinion on the cam-shell, and the rack engaging the pinion.

35. The combination, substantially as hereinbefore set forth, of the parallel knotter-spirals, the studded shanks upon which they are independently mounted, the rotary cam-shell, and the gearing operated from the cranked driving-shaft and actuating said cam-shell to rotate it first one way and then the other, as described.

36. The combination, substantially as hereinbefore set forth, of the cranked driving-shaft, the bevel-gearing oscillating about the axis of vibration of the binder-arm supporting-post, the pitman operating said gearing from the driving-shaft, the reciprocating rack operated from said gearing, the cam-shell, its pinion driven by the rack, and the knotter-spirals actuated by the cam-shell.

37. The combination, substantially as hereinbefore set forth, of the bevel-gears K K', the arm fast on the shaft of the driven gear, the reciprocating rack, the link or pitman connection between said arm and rack, the cam-shell, its pinion, the knotter-spirals, and their shanks, substantially as and for the purpose hereinbefore set forth.

38. The cord-holders constructed with the open heads, substantially as hereinbefore set forth, and having the capability of clamping the band ends separately between the bundle and the point of meeting of said ends, and affording space for the formation of a knot between the points of clamping, as set forth.

39. The combination, substantially as hereinbefore set forth, of the open-headed cord-holders having the capability of clamping the band ends separately, and the cord-rest for locating the meeting-point of said ends in the opening of the clamp-heads, substantially as hereinbefore set forth.

40. The combination, substantially as hereinbefore set forth, of the binder-arm and the open-headed cord-holders having the capability of clamping the band ends at separate points between the bundle and the meeting-point of said ends, and affording space for the formation of a knot between the points of clamping.

41. The combination, substantially as hereinbefore set forth, of the open-headed cord-clamps engaging the band ends separately between the bundle and the meeting-point of said ends, the cord-rest, the binder-arm, and nippers for holding the end of the cord.

42. The combination, substantially as hereinbefore set forth, of the binder-arm, the cord-clamps, nippers for engaging the end of the cord, the guiding-horn, and the guiding-shank of the fixed jaw of the cord-clamps.

43. The combination, substantially as hereinbefore set forth, of the cord-nippers, the cord-guiding horn, and the cord-controller.

44. The combination, substantially as hereinbefore set forth, of the binder-arm, the cord-clamps, the cord-nippers, the cord-guiding horn, the cord-guiding clamp-shank, and the cord-controller.

45. The combination, substantially as hereinbefore set forth, of the fixed member of the cord-clamps, the movable member thereof, the rock-shaft, and its lever, acted upon by the mechanism which operates the knotter, for the purpose described.

46. The combination, substantially as hereinbefore set forth, of the cord-clamps, the rock-shaft supporting the movable member thereof, the spring acting upon said movable member, the rock-shaft lever, the knotter-operating rack-bar, and the tappet thereon.

47. The combination, substantially as hereinbefore set forth, of the spiral knotter and the cord-holders clamping the band ends separately between the bundle and their meeting-point, and affording space between the points of clamping for the formation of the knot by the action of the knotter.

48. The combination, substantially as hereinbefore set forth, of the binder-arm, the cord-nippers, the spiral knotter, and the open-headed cord-holders clamping the band ends separately between the bundle and the meeting-point of said ends, and affording space between the points of clamping for the formation of the knot.

49. The combination, substantially as hereinbefore set forth, of the spiral knotter, the cam-shell, the vibrating arrester, the vibrating binder-arm supporting-post, and connecting mechanism between said post and arrester, for the purpose described.

50. The combination of the knotter-spirals, the studded shanks upon which they are independently mounted, the rotary cam-shell, the vibrating arrester, and the vibrating elbow-lever having link-connections with said arrester, substantially as and for the purpose hereinbefore set forth.

51. The combination of the reciprocating cam-head, the incline thereon, the elbow-lever, the vibrating arrester, the knotter, the link-connection between said elbow-lever and arrester, and the spring acting on the lever, substantially as and for the purpose hereinbefore set forth.

52. The combination, substantially as hereinbefore set forth, of the cord nippers or tongs, their bent shanks mounted to rock about a common axis, the spring acting with a tendency to keep the nippers closed, and cam mechanism by which the nippers are operated, whereby the nippers are caused to slide upon each other and to rock about their axis together and independently, essentially as and for the purpose described.

53. The combination, substantially as hereinbefore set forth, of the cord-nippers, their bent shanks mounted to rock about a common axis, the spring acting with a tendency to keep the nippers closed, cam mechanism by which the nippers are caused to slide upon each other and to rock about their axis together and independently, the cutter pivoted upon one member of the nippers and slotted at its heel, and the fixed pin engaged by the slot, for the purpose described.

54. The combination, substantially as hereinbefore set forth, of the nippers, their bent shanks, the rock-shaft upon which said shanks are respectively fixedly and loosely mounted, the spring connecting the shanks, the reciprocating cam-head, and the stud of the hook-ended member of the nippers working in the cam-slot of said head.

55. The combination of the cam-head, the nippers, the pivoted bent shanks of the nippers rocking about a common axis, the spring acting with a tendency to keep the nippers closed, the nipper-stud acted upon by the cam-head slot, the rocking tappet or tripper pivoted on the cam-head, and the nipper-stud operated upon thereby, substantially as and for the purpose hereinbefore set forth.

56. The combination of the vertically-rocking cord-nippers, the vibrating post supporting the binder-arm, and the mechanism connecting said post with the cord-nippers, substantially as and for the purpose hereinbefore set forth.

57. The combination of the spiral knotter and the spring finger or clearer bearing thereon, and past which the loop of cord is carried by the knotter on its advance, and by which the backward drag of the cord by the knotter is prevented, substantially as hereinbefore set forth.

58. The combination, substantially as hereinbefore set forth, of the knotter-spirals, the cord-clamps, and the spring finger or clearer, substantially as and for the purpose hereinbefore set forth.

59. The combination of the oscillating binder-arm, the rocking take-up arm having the heel-projection, the spring acting on the take-up arm, and the wiper or cam dogging the take-up arm, substantially as and for the purpose hereinbefore set forth.

60. The combination, substantially as hereinbefore set forth, of the binder-arm, its sleeve-bearing, the cord-spool, the arm fast on said bearing, the tension-griper or cord-presser mounted on said bearing-supported arm, the rocking take-up arm, likewise mounted on said arm, the take-up spring, the pulley on the take-up arm, and the binder-arm wiper or cam acting on said take-up arm to dog it against movement during the operations of the knotting devices.

In testimony whereof I have hereunto subscribed my name.

JAMES R. SEVERANCE.

Witnesses:
WM. J. PEYTON,
JAMES YOUNG.